US012490182B2

(12) United States Patent
Adjakple et al.

(10) Patent No.: US 12,490,182 B2
(45) Date of Patent: *Dec. 2, 2025

(54) ENHANCEMENTS FOR EDGE NETWORK ACCESS FOR A UE

(71) Applicant: INTERDIGITAL PATENT HOLDINGS, INC., Wilmington, DE (US)

(72) Inventors: Pascal Adjakple, Great Neck, NY (US); Jiwan Ninglekhu, Royersford, PA (US); Michael Starsinic, Newtown, PA (US); Quang Ly, North Wales, PA (US); Hongkun Li, Malvern, PA (US); Catalina Mladin, Hatboro, PA (US); Guodong Zhang, Woodbury, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/546,128

(22) PCT Filed: Feb. 11, 2022

(86) PCT No.: PCT/US2022/016130
§ 371 (c)(1),
(2) Date: Aug. 11, 2023

(87) PCT Pub. No.: WO2022/174043
PCT Pub. Date: Aug. 18, 2022

(65) Prior Publication Data
US 2024/0137855 A1 Apr. 25, 2024
US 2024/0236835 A9 Jul. 11, 2024

Related U.S. Application Data

(60) Provisional application No. 63/230,095, filed on Aug. 6, 2021, provisional application No. 63/148,842, filed on Feb. 12, 2021.

(51) Int. Cl.
H04W 48/18 (2009.01)
H04L 45/302 (2022.01)
H04W 40/24 (2009.01)

(52) U.S. Cl.
CPC .......... *H04W 48/18* (2013.01); *H04L 45/306* (2013.01); *H04W 40/24* (2013.01)

(58) Field of Classification Search
None
See application file for complete search history.

(56) References Cited

U.S. PATENT DOCUMENTS 11,025,729 B2 * 6/2021 Ouyang ................. H04W 40/20
11,522,323 B2 12/2022 Ott et al.
(Continued)

FOREIGN PATENT DOCUMENTS

WO 2019053308 3/2019
WO 2019/190166 A1 10/2019
(Continued)

OTHER PUBLICATIONS

Ericsson, et al., "DNN in URSP traffic descriptor and route selection descriptor", Doc. C1-217387, 3GPP TSG-CT WG1 Meeting #133-e, E-meeting, Nov. 11-19, 2021,11 pages.
(Continued)

Primary Examiner — Brian S Roberts
(74) Attorney, Agent, or Firm — Chris Kolefas

(57) ABSTRACT

Methods, apparatus, and systems are described for improved edge network access for a UE. According to some aspects, a UE may receive a first Data Network Name (DNN) from an application and determine, based on a Data Network Name (DNN) Replacement Rule, the first DNN is associated with a second Data Network Name (DNN), where the first DNN and the second DNN are different. The UE may determine, based on the DNN Replacement Rule, to asso-
(Continued)

ciate traffic from the application with a Protocol Data Unit (PDU) Session, where the PDU Session may be used to send data from the application to a network and the PDU Session is associated with the second DNN.

20 Claims, 15 Drawing Sheets

(56) References Cited

U.S. PATENT DOCUMENTS

| | | | | |
|---|---|---|---|---|
| 11,553,395 B2* | 1/2023 | Xu | ......................... | H04W 40/02 |
| 11,622,323 B2* | 4/2023 | Zhang | ................... | H04W 40/04 |
| | | | | 370/329 |
| 12,041,135 B2* | 7/2024 | Sun | ....................... | H04W 80/10 |
| 12,200,618 B2* | 1/2025 | Adjakple | .............. | H04W 76/12 |
| 2019/0053308 A1 | 2/2019 | Castellanos Zamora et al. | | |
| 2020/0252285 A1* | 8/2020 | Hietalahti | ........... | H04L 65/1066 |
| 2021/0120596 A1 | 4/2021 | Youn et al. | | |

FOREIGN PATENT DOCUMENTS

| | | | |
|---|---|---|---|
| WO | 2020/200501 A1 | 10/2020 | |
| WO | 2020/252281 A1 | 12/2020 | |

OTHER PUBLICATIONS

Ericsson, et al., "DNN in URSP Traffic Descriptor and Route Selection Descriptor", Doc. S2-2106557, 3GPP TSG-SA WG2 Meeting #146E e-meeting, Elbonia, Aug. 16-27, 2021, 6 pages.

3GPP 3rd Generation Partnership Project; Technical Specification Group Services and System Aspects; System architecture for the 5G System (5GS); Stage 2 (Release 16), 3GPP TS 23.501, V16.6.0, Sep. 2020, pp. 1-447.

3rd Generation Partnership Project; Technical Specification Group Core Network and Terminals; Non-Access-Stratum (NAS) protocol for 5G System (5GS); Stage 3; (Release 17), 3GPP TS 24.501, V17.0.0, Sep. 2020, pp. 1-729.

3rd Generation Partnership Project; Technical Specification Group Core Network and Terminals; User Equipment (UE) policies for 5G System (5GS); Stage 3, (Release 17), 3GPP TS 24.526, V17.0.0, Sep. 2020, pp. 1-52.

3rd Generation Partnership Project; Technical Specification Group Services and System Aspects; Policy and Charging Control Framework for the 5G System; Stage 2, (Release 16), 3GPP TS 23.503, V16.0.0, Mar. 2019, pp. 1-84.

3rd Generation Partnership Project; Technical Specification Group Services and System Aspects; Procedures for the 5G System; Stage 2, Release 16, 3GPP TS 23.502, V16.0.0, Mar. 2019, pp. 1-420.

* cited by examiner

ENHANCEMENTS FOR EDGE NETWORK ACCESS FOR A UE

CROSS-REFERENCE TO RELATED APPLICATIONS

This application is the National Stage Application of International Patent Application No. PCT/US2022/016130, filed Feb. 11, 2022, which claims the benefit of U.S. Provisional Application No. 63/148,842, filed Feb. 12, 2021, entitled "Enhancements for Edge Network Access for a UE," and U.S. Provisional Application No. 63/230,095, filed Aug. 6, 2021, entitled "Enhancements for Edge Network Access for a UE," the contents of which are hereby incorporated by reference in their entirety.

BACKGROUND

Edge computing is designed to support services with low latency. For example, TS 23.503 Rel 16 remarks that the Location Criteria of the User Equipment (UE) route selection policy (URSP) rule are not required to be checked again during the lifetime of the Protocol Data Unit (PDU) Session. However, use cases supporting low latency services with mobility are fundamental to the 5G cellular network, where change of location is common. Accordingly, this also means that when a UE has an established PDU session and if the UE is mobile, the UE may come across a location where the URSP rules may be invalid.

The Time Window and Location Criteria of the URSP are designed with background data transfer in mind. However, with Edge Computing applications, the scope of the Time Window and Location Criteria in a URSP rule may need to be extended and leveraged. It should be noted that current specifications do not mandate a UE to check the Time Window and Location Criteria during the lifetime of the PDU Session. However, if a URSP Rule is configured with location criteria in order to steer a UE towards edge (e.g., local) services and if the UE does not periodically check whether the UE location matches the location criteria that is associated with the route, then the UE will not detect when the route is no longer suitable.

A UE receives a URSP rule after a successful registration, which it uses during a PDU session establishment to select an appropriate route. When a UE is mobile and in a certain location a DNN provided by the URSP rule may not be available or accessible. Additionally, the known DNN may not be capable of delivering the application service requirements (e.g., QoS, SLA) due to traffic, service availability, or other restrictions.

When a UE is in the process of relocating from one Edge Application Server (EAS) to another, it may be necessary for a core network to buffer the UL packets from the UE in a PSA UPF until EAS relocation is completed. However, the core network (SMF) may be unaware of how long the data from the UE/AC needs to be buffered in the PSA. Furthermore, as the requirements may vary for each application, the SMF may not accurately know the buffer space or buffering time needed for seamless EAS relocation. If the application requirement information for seamless EAS relocation is necessary, it is desired to define the application requirement information, the methods by which such information is conveyed to the core network and, how such information impacts EAS relocation process.

The UE may already have connected to an application server in one edge network, and have cached the related DNS record locally. But, when the UE moves, the application located at the old edge network may not be suitable for the UE to visit. As the UE attempts to update the DNS cache, it may flush the cache completely which may not be desirable for future DNS cache reference.

Edge network access for a UE deployments may encompass a wide variety of scenarios, servers, gateways, and devices, such as those described in, for example: 3GPP TS 23.503 Policy and Charging Control Framework for the 5G System, Stage 2 (Release 16); 3GPP TS 23.501 System architecture for the 5G System (5GS), Stage 2 (Release 16); 3GPP TS 23.502 Procedures for the 5G System (5GS), Stage 2 (Release 16); and 3GPP TS 24.526 User Equipment (UE) policies for 5G System (5GS), Stage 3 (Rel 17).

SUMMARY

Described herein are methods, apparatus, and systems for improved edge network access for a UE, which address the shortcomings discussed above.

According to some aspects, an apparatus may include a UE. The apparatus may include a processor, communications circuitry, and a memory. The memory may store instructions that, when executed by the processor, cause the apparatus to perform one or more operations.

The UE may receive a first Data Network Name (DNN) from an application. The UE may determine the first DNN is associated with a second DNN based on a DNN Replacement Rule. For example, the first DNN and the second DNN may be different. Moreover, the DNN Replacement rule may be received by the UE in a UE Configuration Update message.

According to some aspects, the UE may determine to associate traffic from the application with a PDU Session (e.g., associated with the second DNN) based on the DNN Replacement Rule. The PDU Session may be used (e.g., by the UE) to send data from the application to a network. For example, receiving the first DNN from the application may further cause the UE to send a PDU Session Establishment request to the network. The PDU Session Establishment request may include the second DNN. For example, the PDU Session Establishment request may include an indication that the second DNN is a replacement DNN.

According to some aspects, the UE may send an indication (e.g., in a Registration Request) to the network that the UE is capable of receiving the DNN Replacement Rule. The DNN Replacement Rule may be part of a User Equipment Route Selection Policy (URSP) rule. The USRP rule may include a Route Selection Descriptor (RSD). The USRP rule may be received from the network in a Non-Access Stratum (NAS) message. According to some aspects, the URSP rule may originate in a Policy Control Function (PCF) and the NAS message may be received from an Access and Mobility Management Function (AMF).

According to some aspects, the UE may determine the first DNN is part of the traffic descriptor of the URSP rule and may determine the second DNN is part of the RSD. For example, determining the first DNN is part of the traffic descriptor of the URSP rule and determining the second DNN is part of the RSD may indicate that the DNN Replacement rule is part of the URSP rule and/or that the first DNN should be replaced with the second DNN.

According to some aspects, a first network function may receive a DNN replacement rule associated with a UE from a second network function. According to some aspects, the DNN replacement rule may be part of a URSP rule. For example, the DNN replacement rule may be included in a message and the message may include multiple URSP rules.

A first URSP rule including the DNN replacement rule may have a higher priority than a second URSP rule that does not include the DNN replacement rule.

Moreover, the first network function may be an AMF and the second network function may be a PCF. For example, the PCF may send the DNN Replacement Rule to the AMF when an Npcf_UEPolicyControl_Create service is invoked by the AMF. The first network function may send a NAS message to the second network function. The NAS message may include the DNN replacement rule. According to some aspects, during the lifetime of PDU sessions, it may be necessary to re-evaluate URSP rules to check if the Route Selection Validation Criteria is valid. Accordingly, enhancements may be made to URSP rules.

In one aspect, a mechanism is provided by which the network can indicate to the UE in the URSP Rule that the Route Selection Validation Criteria needs to be checked (e.g., reevaluated) each time the UE hands over to a new cell, selects a new cell, or performs a Registration Area Update.

In one aspect, a mechanism by which the Location Criteria is re-evaluated when URSP is re-evaluated in a timely manner, for example when a UE moves from EPC to 5GC.

In one aspect, the URSP Rule may include a timer value, which may be used by the UE to determine how often the route should be checked (e.g., reevaluated), for example, every 1 minute.

In one aspect, the route selection descriptor (RSD) of a URSP Rule may include a Time Window Re-evaluation Indication (TWRI) flag whose presence indicates to the UE that the Time Window information in the RSD should be used as a validation criteria not only when establishing a PDU Session, but also to determine when the PDU Session should be modified or terminated.

In one aspect, the RSD of the URSP Rule may include a Location Criteria Re-evaluation Indication (LCRI) flag whose presence indicates to the UE that the Location Criteria information in the RSD should be used as a validation criteria not only when establishing a PDU Session, but to determine when the PDU Session should be modified or terminated.

In one aspect, the network may provide the UE with a Location Deviation Allowance (LDA) in the RSD when the RSD includes a Location Criteria. For example, the LDA may indicate to the UE how much the UE's location may deviate from the Location Criteria after a PDU Session is established.

In one aspect, the URSP reevaluation including Location Criteria may be initiated by the UE application(s) based on dropped packets or latency threshold triggers as a response from the edge network or from the UE protocol stack.

In one aspect, the UE may re-evaluate the URSP rule that includes the Location Criteria for an application flow when the EAS is relocated.

In one aspect, for the ongoing application flows, the UE may re-evaluate the URSP rules with Location Criteria to determine if better routes can be selected when the DNS record for an EAS is updated or flushed in the UE.

According to some embodiments, 5GC may be enhanced such that when certain conditions are met, the UE may be able to select and replace a DNN in the URSP Rule, e.g., so that the application traffic can use it to reach the required service. Accordingly, enhancements may be made for application triggered DNN replacement.

In one aspect, a UE may be configured with DNN Replacement Rules (e.g., which informs the UE that it is permissible or required under certain conditions) to replace the first DNN that was provided by an application with a second DNN.

In one aspect, the UE may indicate to the network that it is capable of receiving DNN Replacement Rules during a UE Registration or UE Registration Update Procedure.

In one aspect, the UE may receive DNN Replacement rules from the network (e.g., originating from AMF, PCF, and/or UDM/UDR) via NAS Messaging.

According to some embodiments, the UE may be able to assist the network by providing the network with application requirement(s) to help the network select a suitable EAS to serve the UE. Accordingly, enhancements may be made to enable 5GC with such capability.

In one aspect, to mitigate UE's uplink packet loss while facilitating seamless EAS relocation, Application Requirement Information (ARI) for an application in the UE is introduced.

In one aspect, a UE may use PDU Session Establishment Procedure to convey ARI to the network (SMF).

In one aspect, the ARI sent by the UE may be used by the SMF to enable the change of the UL CL and introduce buffer metrics (e.g., buffer time, buffer capacity) to the PSA UPF for the ongoing PDU sessions during EAS relocation.

According to some embodiments, the AF influence may also be used to inform the network about metrics required during EAS relocation.

In one aspect, an EAS may provide (e.g., via the NEF) the parameters in a proposed ARI format to be used by the CN (SMF) for seamless application relocation.

In one aspect, the core network (SMF) may utilize the DNN replacement mechanism to send EAS relocation information to the AMF and the UE (e.g., based on the AF traffic influence request which includes application requirement information).

According to some embodiments, during an EAS relocation process, the UE may be required to flush its DNS cache.

In one aspect, during an EAS discovery process, the associated impact field sent with the DNS re-resolution indication via a PDU Session Modification Command may enable the UE to replace or remove the DNS record based on a predefined algorithm. For example, the algorithm may identify network information received in the associated impact field and may selectively replace/remove the DNS records. This may enable the UE to reduce its DNS resolution time in the future.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to features that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION

Figure 1:
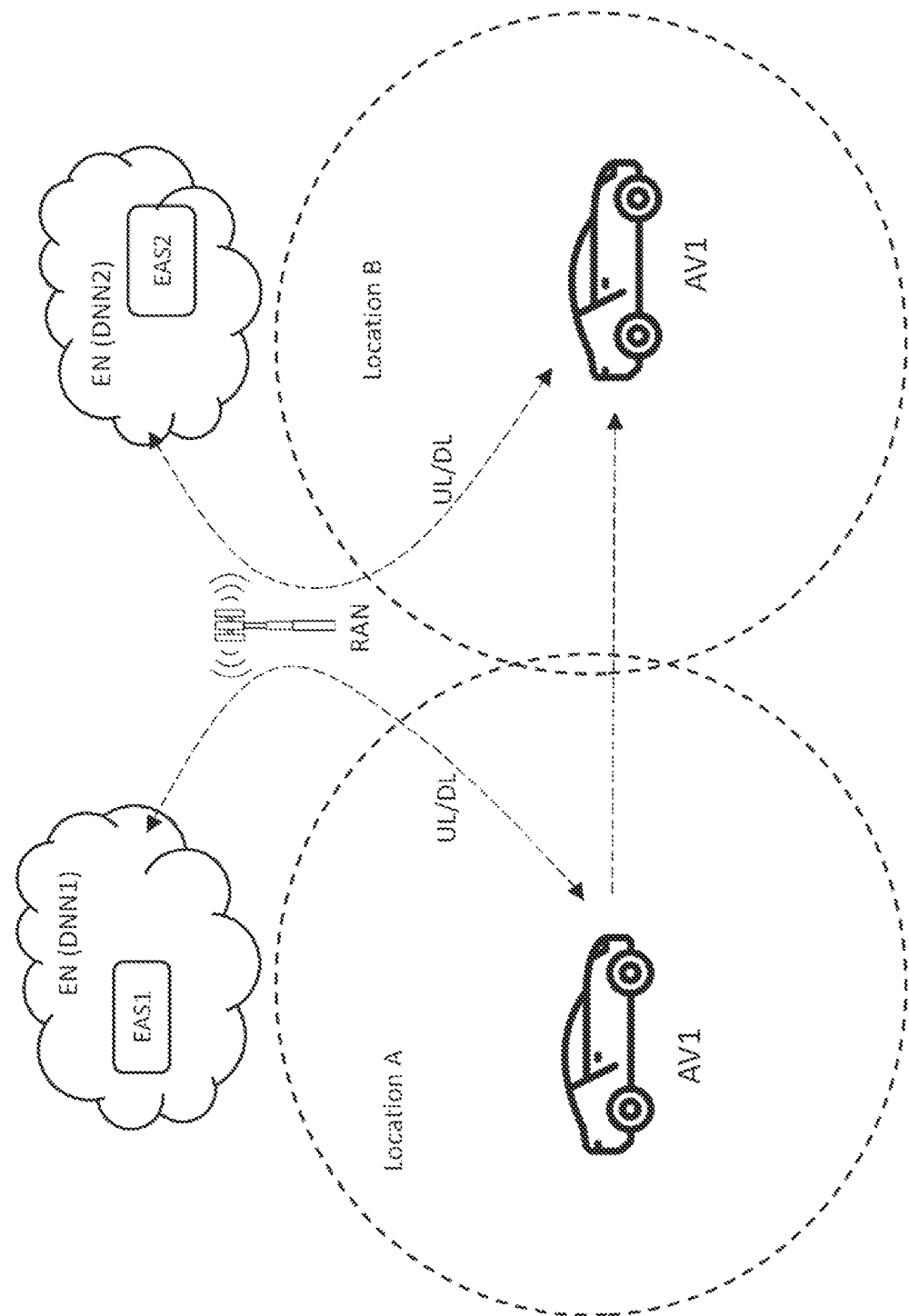
FIG. 1 shows an example of a UE changing location and its serving edge-network.

Table 0.1 describes some of the abbreviations used herein.

TABLE 0.1

| Abbreviations | |
|---|---|
| AC | Application Client |
| AF | Application Function |
| AMF | Access Management Function |
| APN | Access Point Name |
| ARI | Application Requirement Information |
| AS | Application Server |
| CN | Core Network |
| DNAI | Data Network Access Identifier |
| DNN | Data Network Name |
| DNS | Domain Name Server |
| EAS | Edge Application Server |
| EDN | Edge Data Network |
| FQDN | Fully Qualified Domain Name |
| GUI | Graphical User Interface |
| LADN | Local Area Data Network |
| NEF | Network Exposure Function |
| NF | Network Function |
| NRF | Network Resource Function |
| PDU | Protocol Data Unit |
| PSA | PDU session anchor |
| RA | Registration Area |
| SMF | Session Management Function |
| S-NSSAI | Single Network Slice Selection Assistance Information |
| TA | Tracking Area |
| UDM | Unified Data Management |
| UE | User Equipment |
| UL | Uplink |
| UL CL | Uplink Classifier |
| UP | User Plane |
| UPF | User Plane Function |
| V2X | Vehicle to Everything |

Table 0.2 describes some of the definitions of selected terms used herein.

TABLE 0.2

| Definitions | |
|---|---|
| Application Server | An entity deployed on a network node that provides services to Application Clients |
| Application Client | An entity that accesses the services of an Application Server |
| Edge Application Server | A server providing application services that is hosted on an edge node or an Edge Hosting Environment. |

TABLE 0.2-continued

| Definitions | |
|---|---|
| Edge Node | A virtual or physical entity deployed within an edge network and that hosts edge-based applications and services |
| Edge Data Network | Local Data Network that supports distributed deployment of Edge Hosting Environments. In the scope of this paper, Edge Data Network may be used interchangeably with the term Edge Hosting Environment. For example, Servers described to be in the Edge Data Network are running on a corresponding Edge Hosting Environment. |
| Edge Enabler Server | An entity deployed within an edge network that provides edge network centric services to Edge Enabler Clients and Edge Application Servers. Note that in some 3GPP specifications, Edge Enabler Servers are not distinguished functionally from Edge Application Servers, and the "Edge Application Server" terminology applies to both. |
| Edge Enabler Client | An entity deployed on a device that provides edge network centric services to Application Clients hosted on the device. |
| Edge Data Network Configuration Server | An entity in the network that configures Edge Enabler Clients and Edge Enabler Servers to enable the services provided by the Edge Data Network. Edge Data Network Configuration Servers may also be termed Edge Configuration Servers. |
| Edge Hosting Environment | An environment providing support required for Edge Application Server's execution. |
| N6 interface | An interface between the Data Network and the UPF. |
| N9 Interface | Interface between two UPF's (i.e. the Intermediate I-UPF and the UPF Session Anchor). |

DNN and PDU Session Management

Data Network Name

A DNN in 5GS is equivalent to an APN in LTE. See TS 23.503 Policy and Charging Control Framework for the 5G System; Stage 2 (Release 16). Both identifiers have an equivalent meaning between their respective systems and carry similar information. The DNN may be used, e.g., to: (1) Select a SMF and UPF(s) for a PDU Session; (2) Select N6 interface(s) for a PDU Session; and (3) Determine policies to apply to this PDU Session. According to an aspect, the wildcard DNN is a value that can be used for the DNN field of Subscribed DNN list of Session Management Subscription data defined in clause 5.2.3.3 of TS 23.502. For example, the wildcard DNN can be used with an S-NSSAI for the operator to allow the subscriber to access any Data Network supported within the Network Slice associated with the S-NSSAI.

Session Management

The 5GC supports a PDU Connectivity Service. The PDU Connectivity Service is supported via PDU Sessions that are established upon request from the UE. The Subscription Information for each S-NSSAI may contain a Subscribed DNN list and one default DNN. When the UE does not provide a DNN in a NAS Message containing PDU Session Establishment Request for a given S-NSSAI, the serving AMF determines the DNN for the requested PDU Session by selecting the default DNN for this S-NSSAI if a default DNN is present in the UE's Subscription Information; otherwise the serving AMF selects a locally configured DNN for this S-NSSAI.

According to an aspect, the URSP in the UE is always up to date using the procedure defined in TS 23.502 clause 4.16.12.2 and therefore the UE requested DNN will be up to date. In order to cover cases where the UE operates using local configuration, but also other cases where operator policies can be used in order to replace an "up to date" UE requested DNN with another DNN used only internally in the network, during UE Registration procedure the PCF may indicate, to the AMF, the operator policies to be used at PDU Session Establishment for DNN replacement of a UE requested DNN. PCF may indicate a policy for DNN replacement of UE requested DNNs not supported by the network, and/or indicate a list of UE requested DNNs per S-NSSAI valid for the serving network, that are subject for replacement (details are described in TS 23.503).

If the DNN provided by the UE is not supported by the network and the AMF cannot select an SMF by querying NRF, the AMF may reject the NAS Message containing PDU Session Establishment Request from the UE with a cause indicating that the DNN is not supported unless the PCF provided the policy to perform a DNN replacement of unsupported DNNs.

If the DNN requested by the UE is indicated for replacement or the DNN provided by the UE is not supported by the network and the PCF provided the policy to perform DNN replacement of UE requested DNNs not supported by the network, the AMF may interact with the PCF to perform a DNN replacement. During PDU Session Establishment procedure and as a result of DNN replacement, the PCF may provide a list of selected DNN for replacement that is applicable for the S-NSSAI requested by the UE at the PDU Session Establishment. The AMF may use the selected DNN in the query towards the NRF for the SMF selection, and provide both requested and selected DNN to the selected SMF.

According to an aspect, interaction between the AMF and PCF may be required when DNN Replacement is performed in the network.

URSP Rules

The UE Route Selection Policy (URSP) includes a prioritized list of URSP rules. See 3GPP TS 23.503. Table 1 depicts a URSP.

TABLE 1

UE Route Selection Policy

| Information name | Description | Category | PCF permitted to modify in a URSP | Scope |
| --- | --- | --- | --- | --- |
| URSP rules | 1 or more URSP rules as specified in table 6.6.2.1-2 | Mandatory | Yes | UE context |

The structure of the URSP rules is described in Table 2 and Table 3.

TABLE 2

UE Route Selection Policy Rule

| Information name | Description | Category | PCF permitted to modify in a UE context | Scope |
| --- | --- | --- | --- | --- |
| Rule Precedence | Determines the order the URSP rule is enforced in the UE. | Mandatory (NOTE 1) | Yes | UE context |
| Traffic descriptor | This part defines the Traffic descriptor components for the URSP rule. | Mandatory (NOTE 3) | | |
| Application descriptors | It consists of OSId and OSAppId(s). (NOTE 2) | Optional | Yes | UE context |
| IP descriptors (NOTE 5) | Destination IP 3 tuple(s) (IP address or IPv6 network prefix, port number, protocol ID of the protocol above IP). | Optional | Yes | UE context |
| Domain descriptors | Destination FQDN(s) | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |
| List of Route Selection Descriptors | A list of Route Selection Descriptors. The components of a Route Selection Descriptor are described in table 6.6.2.1-3. | Mandatory | | |

NOTE 1:
Rules in a URSP shall have different precedence values.
NOTE 2:
The information is used to identify the Application(s) that is(are) running on the UE's OS. The OSId does not include an OS version number. The OSAppId does not include a version number for the application.
NOTE 3:
At least one of the Traffic descriptor components shall be present.
NOTE 4:
The format and some values of Connection Capabilities, e.g., "ims", "mms", "internet", etc., are defined in TS 24.526 [19]. More than one connection capabilities value can be provided.
NOTE 5:
A URSP rule cannot contain the combination of the Traffic descriptor components IP descriptors and Non-IP descriptors.

TABLE 3

Route Selection Descriptors

| Information name | Description | Category | PCF permitted to modify in URSP | Scope |
|---|---|---|---|---|
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. (NOTE 5) | Optional | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |
| PDU Session Type Selection | One single value of PDU Session Type | Optional (NOTE 8) | Yes | UE context |
| Non-Seamless Offload indication | Indicates if the traffic of the matching application is to be offloaded to non-3GPP access outside of a PDU Session. | Optional (NOTE 4) | Yes | UE context |
| Access Type preference | Indicates the preferred Access Type (3GPP or non-3GPP or Multi-Access) when the UE establishes a PDU Session for the matching application. | Optional | Yes | UE context |
| Route Selection Validation Criteria (NOTE 6) | This part defines the Route Validation Criteria components | Optional | | |
| Time Window | The time window when the matching traffic is allowed. The RSD is not considered to be valid if the current time is not in the time window. | Optional | Yes | UE context |
| Location Criteria | The UE location where the matching traffic is allowed. The RSD rule is not considered to be valid if the UE location does not match the location criteria. | Optional | Yes | UE context |

NOTE 1:
Every Route Selection Descriptor in the list shall have a different precedence value.
NOTE 2:
At least one of the route selection components shall be present.
NOTE 3:
When the Subscription Information contains only one S-NSSAI in UDR, the PCF needs not provision the UE with S-NSSAI in the Network Slice Selection information. The "match all" URSP rule has one S-NSSAI at most.
NOTE 4:
If this indication is present in a Route Selection Descriptor, no other components shall be included in the Route Selection Descriptor.
NOTE 5:
The SSC Mode 3 shall only be used when the PDU Session Type is IP.
NOTE 6:
The Route Selection Descriptor is not considered valid unless all the provided Validation Criteria are met.
NOTE 7:
In this Release of specification, inclusion of the Validation Criteria in Roaming scenarios is not considered.
NOTE 8:
When the PDU Session Type is "Ethernet" or "Unstructured", this component shall be present.

URSP Rule Evaluation

For every new application flow that needs to be established, the UE evaluates URSP rules in the order of Rule Precedence, then the UE either triggers a PDU session establishment or uses an existing PDU session for the flow. The Location attribute is a URSP Rule constraint that needs to be valid for the URSP rule to be applicable. That is, when the Route Selection Descriptor includes a Time Window or a Location Criteria, the traffic flow is considered matching only if the UE's location matches the Location Criteria Validity Conditions. In addition, TS 23.503 Rel 16 describes that the UE evaluates (e.g., re-evaluates) the validities of URSP rules in a timely manner when certain conditions are met, for example, the URSP is updated by the PCF when: the UE moves from EPC to 5GC; change of Allowed NSSAI or Configured NSSAI; change of LADN DNN availability; UE registers over 3GPP or non-3GPP access; UE establishes connection to a WLAN access.

According to TS 24.526, the UE may re-evaluate the URSP rules, to check if the change of the association of an application to a PDU session is needed, when: the UE performs periodic URSP rules re-evaluation based on UE implementation; the UE NAS layer indicates that an existing PDU session used for routing traffic of an application based on a URSP rule is released; the URSP is updated by the PCF; the UE NAS layer indicates that the UE performs inter-system change from S1 mode to N1 mode; the UE NAS layer indicates that the UE is successfully registered in N1 mode over 3GPP access or non-3GPP access; the UE establishes or releases a connection to a WLAN access and transmission of a PDU of the application via non-3GPP access outside of a PDU session becomes available/unavailable; the allowed NSSAI is changed; or the LADN information is changed.

If the re-evaluation leads to a change of the association of an application to a PDU session, the UE may enforce such change immediately or when UE returns to 5GMM-IDLE mode. The URSP handling layer may request the UE NAS layer to release an existing PDU session after the re-evaluation.

Problem Statement

The benefits of deploying Edge Application Servers (EASs) at the edge network of a 3GPP system may include reduced access latency and increased reliability for Application Clients (ACs) in the UE that access the services offered by these EASs. FIG. 1 depicts an autonomous vehicle (AV) AV1 that is moving from Location A to Location B, where Location A and Location B signifies a location unit such as a cell or a tracking area. An autonomous vehicle may host a UE wherein the UE may have a V2X AC capability. A system such as the V2X demands (ultra) low latency service. The UE communicates with V2X services (e.g., platooning service, cooperative driving service, collision avoidance service, etc.) deployed on the edge nodes in a 3GPP system. The preferred method for accessing the V2X services by V2X ACs would be via V2X EASs that are deployed in edge networks in the system which are in closer proximity to the vehicles.

When such AV travels from one location to another, a V2X AC may be handed over between EASs hosted on different edge networks in the closest proximity and such handovers must be coordinated properly. FIG. 1 shows that AV1 moves from Location A being served by EAS1 to Location B, ending up in being served by the EAS2 for same services.

Problem

Edge computing is designed to support services with low latency. TS 23.503 Rel 16 remarks that the Location Criteria of the URSP rule are not required to be checked again during the lifetime of the PDU Session. However, use cases such as the one discussed herein (See FIG. 1), supporting low latency services with mobility is fundamental to the 5G cellular network, where change of location is common. This also means that when a UE has an established PDU session and if the UE is mobile, the UE may come across a location where the URSP rules may be invalid.

The Time Window and Location Criteria of the URSP may be designed with background data transfer in mind. However, with Edge Computing applications, the scope of the Time Window and Location Criteria in a URSP rule may need to be extended and leveraged. It should be noted that current specifications do not mandate a UE to check the Time Window and Location Criteria during the lifetime of the PDU Session. See 3GPP TS 23.503 Policy and Charging Control Framework for the 5G System; Stage 2 (Release 16). However, if a URSP Rule is configured with location criteria in order to steer a UE towards edge (e.g., local) services and if the UE does not periodically check whether the UE location matches the location criteria that is associated with the route, then the UE will not detect when the route is no longer suitable.

A UE may receive a URSP rule after a successful registration, which it may use during a PDU session establishment to select an appropriate route. When a UE is mobile and in a certain location a DNN provided by the URSP rule may not be available or accessible. Additionally, the known DNN may not be capable of delivering the application service requirements (e.g., QoS, SLA) due to traffic, service availability, or other restrictions.

When a UE is in the process of relocating from one EAS to another, it may be necessary for a core network to buffer the UL packets from the UE in a PSA UPF until EAS relocation is completed. However, the core network (SMF) may be unaware of how long the data from the UE/AC needs to be buffered in the PSA. Furthermore, as the requirements may vary for each application, the SMF may not accurately know the buffer space or buffering time needed for seamless EAS relocation. If the application requirement information for seamless EAS relocation is necessary, it is desired to define the application requirement information, the methods by which such information is conveyed to the core network and, how such information impacts EAS relocation process.

The UE may already have connected to an application server in one edge network, and have cached the related DNS record locally. But, when the UE moves, the application located at the old edge network may not be suitable for the UE to visit. As the UE attempts to update the DNS cache, it may flush the cache completely which may not be desirable for future DNS cache reference.

SUMMARY

During the lifetime of PDU sessions, it may be necessary to re-evaluate URSP rules to check if the Route Selection Validation Criteria is valid. The Following enhancements in URSP rules may be made according to some aspects.

First, a mechanism by which the network can indicate to the UE in the URSP Rule that the Route Selection Validation Criteria needs to be checked (e.g., reevaluated) each time the UE hands over to a new cell, selects a new cell, or performs a Registration Area Update.

Second, a mechanism by which the Location Criteria may be re-evaluated when URSP is re-evaluated in a timely manner, for example when UE moves from EPC to 5GC.

Third, the URSP Rule may include a timer value, which may be used by the UE to determine how often the route should be checked/reevaluated, for example, every 1 minute.

Fourth, the RSD of a URSP Rule may include a Time Window Re-evaluation Indication (TWRI) flag whose presence indicates to the UE that the Time Window information in the RSD should be used as a validation criteria not only when establishing a PDU Session, but also to determine when the PDU Session should be modified or terminated.

Fifth, the RSD of the URSP Rule may include a Location Criteria Re-evaluation Indication (LCRI) flag whose presence indicates to the UE that the Location Criteria information in the RSD should be used as a validation criteria not only when establishing a PDU Session, but to determine when the PDU Session should be modified or terminated.

Sixth, the network can provide the UE with a Location Deviation Allowance (LDA) in the RSD when the RSD includes a Location Criteria. The LDA may indicate to the UE how much the UE's location may deviate from the Location Criteria after a PDU Session is established.

Seventh, the URSP reevaluation including Location Criteria may be initiated by the UE application(s) based on dropped packets or latency threshold triggers as a response from the edge network or, from the UE protocol stack.

Eighth, UE may re-evaluate the URSP rule that includes the Location Criteria for an application flow when the EAS is relocated.

Ninth, for the ongoing application flows, the UE may re-evaluate the URSP rules with Location Criteria to determine if better routes can be selected when the DNS record for an EAS is updated or flushed in the UE.

According to some aspects, 5GC may be enhanced such that when certain conditions are met, the UE may be able to select and replace a DNN in the URSP Rule, so that the application traffic can use it to reach the required service. According to some aspects, the following enhancements may be made for application triggered DNN replacement:

First, a UE may be configured with DNN Replacement Rules, which informs the UE that it is permissible, or required under certain conditions, to replace the first DNN that was provided by an application with a second DNN.

Second, the UE may indicate to the network that it is capable of receiving DNN Replacement Rules during a UE Registration or UE Registration Update Procedure.

Third, the UE may receive DNN Replacement rules from the network (originating from AMF, PCF, and/or UDM/UDR) via NAS Messaging.

According to some aspects, DNN Replacement Rules may be provided to the UE in information elements that are separate from URSP Rules. Each DNN Replacement rule may consist of one or more "Original DNN", a "Replacement DNN" and service area information where the rules may be applied. URSP Rules may be explicitly linked with the DNN Replacement Rules. The URSP Rules may be enhanced so that the network can include an indication if the DNN that was provided in the Traffic Descriptor may not be replaced. Alternatively, the network may provide a "DNN Replacement Evaluation Required" indication in the Traffic Descriptor or RSD parts of the URSP Rule to indicate to the UE that the URSP Rule requires that the DNN Replacement Rules also be evaluated with the URSP Rule.

The UE may provide an indication that it supports receiving DNN Replacement Rules or it may request DNN Replacement Rules. The request may explicitly indicate what Original DNN's the UE might use.

If no support indication is provided, then the UE should indicate to the network that DNN replacement was performed during PDU Session Establishment. The PDU Session Establishment Request may also provide the "Original DNN".

The UE may be configured to not apply DNN Replacement Rules to a DNN that is derived from an LADN Information element. The LADN Information Element may be updated so that the network can indicate to the UE whether DNN replacement rules should be applied to an LADN DNN. The UE may be configured to only apply the DNN Replacement Rules to an LADN DNN if the UE is not in the service area of the LADN.

The UE may be able to assist the network by providing the network application with requirement information to assist the network in selecting an EAS. According to some aspects, the following enhancements may enable 5GC with such capability:

First, to mitigate UE's uplink packet loss while facilitating seamless EAS relocation, Application Requirement Information (ARI) for an application in the UE is introduced.

Second, a UE may use PDU Session Establishment Procedure to convey ARI to the network (SMF).

Third, the ARI sent by the UE may be used by the SMF to enable the change of the UL CL and introduce buffer metrics (e.g., buffer time, buffer capacity) to the PSA UPF for the ongoing PDU sessions during EAS relocation.

According to some aspects, the AF influence may also be used to inform the network about metrics required during EAS relocation:

First, a mechanism by which an EAS may provide, via the NEF, the parameters in a proposed ARI format to be used by the CN (SMF) for seamless application relocation.

Second, based on the AF traffic influence request which includes application requirement information, the core network (SMF) may utilize the DNN replacement mechanism to send EAS relocation information to the AMF and the UE.

During an EAS relocation process, the UE may be required to flush its DNS cache. The following approach may be used, according to some aspects, for flushing a DNS cache:

First, during an EAS discovery process, the associated impact field sent with the DNS re-resolution indication via a PDU Session Modification Command may enable a UE to replace or remove the DNS record based on a predefined algorithm. The algorithm may identify network information received in the associated impact field and may selectively replace/remove the DNS records. This enables the UE to reduce its DNS resolution time in the future.

5G Enhancements to Allow for Greater Network Control of the UE's PDU Sessions

According to the current 3GPP specifications, URSP rules are re-evaluated in a timely manner when the trigger conditions (e.g., the URSP is updated by the PCF, the UE moves from EPC to 5GC, change of Allowed NSSAI or Configured NSSAI, etc.) are met. According to some aspects, the 5G System may be enhanced so that the network can configure the UE such that the UE can detect when it needs to check whether the Route Selection Validation Criteria (e.g., Location Criteria and Time Window) that is associated with an established PDU Session is still valid. By configuring the UE to detect when the Route Selection Validation Criteria is no longer valid, the UE may be able to more quickly detect when it is possible to terminate, modify, and/or establish a PDU Session.

The triggers for URSP re-evaluation may be initiated by the UE application(s) based on dropped packets or observed latency between the UE and the edge network. Additionally, the trigger may be sent from the UE protocol stack based on degradation of latency, QoS, etc. indicated by QFI markings. According to some aspects, the network may be able to include information in the URSP rule to help the UE to determine when it needs to check whether the Route Selection Validation Criteria (Location Criteria and Time Window) that is associated with an established PDU Session is still valid. For example:

First, the network may indicate in the URSP Rule that the Route Selection Validation Criteria needs to be checked (e.g., reevaluated) each time the UE hands over to a new cell, selects a new cell, or performs a Registration Area Update. This indication can be sent to the UE in the RSD part of the URSP rule.

Second, the network may indicate a timer value in the URSP rule. This timer value may be used by the UE to determine how often to check/reevaluate whether the route is valid. For example, the timer may indicate a value of 1 minute. This may cause the UE to check (e.g., reevaluate) whether the route is valid every minute.

Third, the URSP Rule may be enhanced to include a Time Window Re-evaluation Indication (TWRI) flag whose presence indicates to the UE that the Time Window information in the RSD should be used as a validation criteria not only when establishing a PDU Session, but to determine when the PDU Session should be modified or terminated.

Fourth, the URSP Rule may be enhanced to include a Location Criteria Re-evaluation Indication (LCRI) flag whose presence indicates to the UE that the Location Criteria information in the RSD should be used as a validation criteria not only when establishing a PDU Session, but to determine when the PDU Session should be modified or terminated.

Fifth, the network may provide the UE with a Location Deviation Allowance (LDA) in the RSD when the RSD includes a Location Criteria. The LDA may indicate to the UE how much the UE's location may deviate from the Location Criteria after a PDU Session is established. Once the PDU Session is established and the UE detects that its location deviates from the Location Criteria more than the LDA, the UE may reevaluate its URSP rules and, terminate or modify the PDU Session.

Sixth, URSP reevaluation rules may be enhanced such that the Location Criteria is re-evaluated in a timely manner, for example when the URSP is updated by the PCF, the UE moves from EPC to 5GC, change of Allowed NSSAI or Configured NSSAI, etc.

Seventh, when the EAS is relocated, a UE needs to re-evaluate the URSP rule that includes the Location Criteria for the same application flow.

Eighth, when the DNS record for an EAS is updated or flushed in the UE, for the ongoing application flows, the UE may re-evaluate the URSP rules with Location Criteria to determine if better routes may be selected for the application flows.

It should be noted that the UE may be configured such that checking (e.g., reevaluating) RSDs is only done when the UE is in the CM-CONNECTED state.

Note that only the URSP rules of current traffic in use is re-evaluated when the triggering events for RSD reevaluation occur. Alternatively, the UE may keep a list of URSP rules that have been applied for active flows and which require or allow for re-evaluation.

Table 4 presents an RSD that has been enhanced to include the fields that are described above. Note that "selecting a route" means that the UE selects an existing PDU Session that matches the route or determines to establish a PDU Session that matches the route.

TABLE 4

Enhanced Route Selection Description

| Information name | Description | Category | PCF permitted to modify in URSP | Scope |
| --- | --- | --- | --- | --- |
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. (NOTE 5) | Optional | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |
| PDU Session Type Selection | One single value of PDU Session Type | Optional | Yes | UE context |
| Non-Seamless Offload indication | Indicates if the traffic of the matching application is to be offloaded to non-3GPP access outside of a PDU Session. | Optional (NOTE 4) | Yes | UE context |
| Access Type preference | Indicates the preferred Access Type (3GPP or non-3GPP or Multi-Access) when the UE establishes a PDU Session for the matching application. | Optional | Yes | UE context |
| Route Selection Validation Criteria (NOTE 6) | This part defines the Route Validation Criteria components | Optional | | |
| Time Window | The time window when the matching traffic is allowed. The RSD is not considered to be valid if the current time is not in the time window. The Time Window may include a TWRI flag. | Optional | Yes | UE context |
| Location Criteria | The UE location where the matching traffic is allowed. The RSD rule is not considered to be valid if the UE location does not match the location criteria. The Location Criteria may include a LCRI flag. | Optional | Yes | UE context |

TABLE 4-continued

Enhanced Route Selection Description

| Information name | Description | Category | PCF permitted to modify in URSP | Scope |
| --- | --- | --- | --- | --- |
| Location Criteria Re-evaluation Criteria | The events that will trigger the UE to reevaluate the validity of route (e.g., handover, Registration update) | Optional | Yes | UE Context |
| Re-evalaution Timer | An indication of how often the UE shall check the validity of the route. | Optional | Yes | UE Context |

NOTE 1:
Every Route Selection Descriptor in the list shall have a different precedence value.
NOTE 2:
At least one of the route selection components shall be present.
NOTE 3:
When the Subscription Information contains only one S-NSSAI in UDR, the PCF needs not provision the UE with S-NSSAI in the Network Slice Selection information. The "match all" URSP rule has one S-NSSAI at most.
NOTE 4:
If this indication is present in a Route Selection Descriptor, no other components shall be included in the Route Selection Descriptor.
NOTE 5:
The SSC Mode 3 shall only be used when the PDU Session Type is IP.
NOTE: 6
The Route Selection Descriptor is not considered valid unless all the provided Validation Criteria are met.
NOTE: 7
In this Release of specification, inclusion of the Validation Criteria in Roaming scenarios is not considered.
NOTE: 8
When the PDU Session Type is "Ethernet" or "Unstructured", this component shall be present.

DNN Replacement in the UE

A URSP rule may be configured such that when certain conditions are met, the UE will select a DNN that the application traffic may use to reach the required service. The selected DNN may be based on the type of application, application ID, IP Address or FQDN that is being contacted, location of the UE, etc. According to some aspects, when edge services are available, the selected DNN may be associated with an Edge Network.

Some applications may be designed such that they provide the DNN to the UE. For example, an application may provide a DNN to the UE when it initially generates IP traffic. In such a scenario, URSP rules are not used to select the DNN. Rather, the UE may use the DNN that is provided by the application. URSP rules may still be used to determine what route should be used to reach the DNN (e.g., what existing or new PDU Session should be used to reach the DNN). In such a scenario, the application designer may prefer to design the application such that the application always provides the same DNN to the UE, regardless of what MNO is serving the UE. However, different MNOs may desire to route the application's traffic differently. For example, one MNO may prefer to route the application traffic to a special data network that is dedicated to the Application while another MNO may prefer to give no special treatment to the application's traffic and route the traffic to a data network that is shared with many other applications (e.g., the internet).

In another example, it is often preferable for Edge Applications to send and receive data from edge data networks. According to some aspects, edge data networks are data networks that are geographically close to the UE that host the Edge Application. Since each data network may have a different DNN, the Edge Application designer may prefer to design the application such that the application always provides the same DNN to the UE, regardless of what edge data network is closest to the UE.

When considering edge services, it may be desirable to have the UE with an awareness that certain DNNs may be associated with Edge Data Networks, which have different DNNs. For example, the UE may be configured with DNN Replacement Rules. DNN Replacement Rules tell the UE that it is permissible, or may be required under certain conditions, to replace a first DNN that was provided by an application with a second DNN. For example, the rule may indicate that for certain types of application traffic, when the UE is in a particular location and the DNN is not accessible, or if a given DNN is not capable of delivering the application service requirements due to traffic or service availability, the UE must replace DNN-A with DNN-B and provide DNN-B to the network when establishing a PDU Session.

The UE may indicate to the network (e.g., during registration) that it is capable of receiving DNN Replacement Rules. According to some aspects, a support indication may be desirable because current UE behavior is that if one or more DNNs are included in the traffic descriptor of a URSP rule and one or more DNNs are included in the route selection descriptor, the route selection descriptor is ignored, see TS 24.526 [6]. If the enhanced URSP rules are sent to a UE that does not support this enhancement, it may result in RSDs that are ignored by the UE.

Note that by having the UE apply DNN Replacement Rules instead of the AMF applying DNN replacement rules, the required interaction between the AMF and PCF to apply DNN Replacement Rules in the AMF may be avoided.

The UE may receive DNN Replacement rules from the AMF via NAS Messaging. The DNN Replacement rules may originate from the UDM/UDR, PCF, or AMF. DNN Replacement rules may be used in combination with the URSP Rule enhancements.

DNN Replacement rules may be part of URSP Rules. For example, the URSP rule may indicate that when a DNN is provided by the application as part of the traffic descriptor, the DNN may be replaced. The network may indicate this to the UE by including DNN(s) in both the Traffic Descriptor and RSD parts of the URSP rule. For example, the old DNN may be provided in the traffic descriptor, and the new DNN may be provided in the RSD portion of the URSP. Alternatively, the network may provide a separate indication that the UE may perform DNN replacement preemptively for cases in which applications provide the DNN.

According to some aspects, when a UE sends a PDU SESSION ESTABLISHMENT request to the network, the UE may indicate a DNN in the NAS message. The DNN that the UE provides may be an indication of a data network that the UE is requesting to use a PDU Session to send and receive data to and from the data network. The UE must determine what DNN to include in the NAS message when sending a PDU SESSION ESTABLISHMENT request. The process of the UE determining what DNN to include in the NAS message when sending a PDU SESSION ESTABLISHMENT request may be called "DNN Selection".

According to some aspects, a UE may perform DNN replacement. According to some aspects, DNN Replacement may be considered part of, or a step within, the DNN Selection process. According to some aspects, DNN Replacement may be performed as a consequence of DNN Selection. DNN Selection may consist of the UE determining to include a DNN that was provided by an application in the NAS message when sending a PDU SESSION ESTABLISHMENT request. According to some aspects, DNN Selection may consist of the UE determining to include a DNN that was provided by an application in the NAS message when sending a PDU SESSION MODIFICATION request. According to some aspects, DNN Selection may consist of the UE determining to include in the NAS message when sending a PDU SESSION ESTABLISHMENT request or a PDU SESSION MODIFICATION request, a DNN that was previously provided to the UE for the said PDU session by the network, e.g., during a prior interaction between the UE and the network. DNN Selection may consist of the UE evaluating URSP rules to determine a DNN that will be included in the NAS message when sending a PDU SESSION ESTABLISHMENT request or a PDU SESSION MODIFICATION request. According to some aspects, described DNN Replacement procedures may be used by the UE to enhance the DNN Selection process.

According to some aspects, DNN Selection, and therefore DNN Replacement in a UE, may be triggered when an application that is hosted by the UE initiates application layer traffic or provides a traffic descriptor for example in a modified application layer traffic, such as DNN, to the UE.

According to some aspects, the described enhancements to the PDU Session Establishment procedure may be applied to the PDU Session Modification procedure so that the UE may request to change the DNN that is associated with a PDU Session. According to some aspects, the PDU SESSION MODIFICATION request may be used by the UE to change the DNN that is associated with a PDU Session. For example, this may be used if the UE moved to a location where an LADN is available and the UE would like to move the traffic that is associated with the PDU Session to the LADN. When the UE sends a PDU SESSION MODIFICATION request to the network with a new DNN, the request may trigger SMF and UPF reselection in the network.

Conveying Application Requirements to the Core Network

According to some aspects, DNN Replacement Rules may be received by the UE. Each rule may consist of a first DNN, a second DNN and service area information where the rules should be applied.

According to some aspects, the first DNN may be the DNN that is provide by the application (e.g., provided by the application as part of the traffic descriptor) or the first DNN may be the DNN that is determined by the UE when it evaluates the URSP rules based on the applications traffic descriptor. The first DNN may be referred to as an "Original DNN".

According to some aspects, the second DNN may be the replacement DNN. When the UE determines to apply the DNN Replacement Rule, the UE may replace the first DNN with the second DNN. For example, replacing the first DNN with the second DNN may include using a PDU Session that is associated with the second DNN to send the application data the second DNN may be referred to as a replacement DNN.

According to some aspects, the service area information where the rules should be applied is location information that indicates to the UE when the rule should be applied. According to some aspects, the advantage of providing service area information in the DNN rule may be that it gives the network the ability to tell the UE in what locations the rule should be applied. This may be advantageous in a situation where the second DNN is only available in certain locations and in situations where the second DNN is only preferable to the first DNN in certain locations. The Service area information may be a set of tracking areas in the current registration area, a set of coordinates, or a set of cell IDs.

According to some aspects, a DNN Replacement Rule may consist of one or more Original DNNs and one Replacement DNN. For example, the rule may be interpreted by the UE as an instruction to replace the Original DNNs with the Replacement DNN when the UE is in the service area that is indicated by the rule.

According to some aspects, the UE may be provided with multiple DNN Replacement Rules, e.g., multiple rules may apply to the same Original DNN. For example, the same Original DNN may appear in two different DNN Replacement Rules. According to some aspects, this type of configuration may be desirable when the Original DNN should be replaced with Replacement DNN #1 in service area #1 and the Original DNN should be replaced with Replacement DNN #2 in service area #2.

According to some aspects, in order to simplify the encoding of the DNN Replacement Rules, the UE may be configured to evaluate and apply the DNN Replacement Rules in a priority order. For example, if the UE is provided with a list of N DNN Replacement Rules and it discovers a desired Original DNN value in DNN Replacement Rule #1, then the UE may apply DNN Replacement Rule #1 and not evaluate the subsequent DNN Replacement Rules (even if the desired Original DNN value appears in the other N−1 DNN Replacement Rules). Alternatively, the subsequent DNN replacement rules may take priority and the UE may apply the last DNN Replacement Rule that it evaluates and that includes the desired Original DNN value.

Table 7 illustrates an example encoding of a DNN Replacement Rules Information element. According to some aspects, this information element includes of 1 or more DNN Replacement Rules and the encoding is further described in Table 7.

TABLE 5

DNN Replacement Rules information element encoding

| 8 | 7 | 6 | 5 | 4 | 3 | 2 | 1 | |
|---|---|---|---|---|---|---|---|---|
| DNN Replacement Rules information IEI | | | | | | | | octet 1 |
| Length of DNN Replacement Rules contents | | | | | | | | octet 2 |
| | | | | | | | | octet 3 |
| DNN Replacement Rule 1 | | | | | | | | octet 4 |
| | | | | | | | | octet a |

TABLE 5-continued

DNN Replacement Rules information element encoding

| 8 | 7 | 6 | 5 | 4 | 3 | 2 | 1 | |
|---|---|---|---|---|---|---|---|---|
| | DNN Replacement Rule 2 | | | | | | | octet a + 1* |
| | | | | | | | | octet b* |
| | ... | | | | | | | octet b + 1* |
| | | | | | | | | octet g* |
| | DNN Replacement Rule n | | | | | | | octet g + 1* |
| | | | | | | | | octet h* |

Table 6 illustrates an example encoding of a DNN Replacement Rule Information element. According to some aspects, this information element includes 1 DNN Replacement Rule.

TABLE 6

DNN Replacement Rule information element encoding

| 8 | 7 | 6 | 5 | 4 | 3 | 2 | 1 | |
|---|---|---|---|---|---|---|---|---|
| | Length of DNN Replacement Rule value | | | | | | | octet 4 |
| | Original DNN values (e.g., first DNN value) | | | | | | | octet 5 |
| | | | | | | | | octet m |
| | Replacement DNN value (e.g., second DNN value) | | | | | | | octet m + 1 |
| | | | | | | | | octet b |
| | 5GS tracking area identity list | | | | | | | octet b + 1 |
| | | | | | | | | octet c |

TABLE 7

DNN Replacement Rules information element

The value part of the DNN Replacement Rules information element is in octet 4 to octet h,
The value part of the DNN Replacement Rules information element consists of one or several DNN Replacement Rules.
Each DNN Replacement Rule (e.g., octet 4 to octet a) consists one or more Original DNN values, one Replacement DNN value, and one 5GS tracking area identity list.
The length of each DNN Replacement Rule is determined by the length of the Original DNN value fields, the length of the one Replacement DNN value field, and the length of 5GS tracking area identity list field.
Each Original DNN value field and the Replacement DNN value field may be encoded as DNN value part of DNN information element as specified in subclause 9.11.2.1B of TS 24.501 [5] starting with the third octet.
The 5GS tracking area identity list is in (octet m + 1 to octet a).
The 5GS tracking area identity list field is coded as the length and the value part of the 5GS
Tracking area identity list information element as specified in subclause 9.11.3.9 of TS 24.501 [5] starting with the second octet.

According to some aspects, the DNN Replacement Rules may be slice-based. For example, the encodings that are shown in Table 5, Table 6, and Table 7 may be enhanced to allow the network to send DNN Replacement Rules to the UE that are slice based. For example, the DNN Replacement Rules information element may indicate to the UE that the replacement rules only apply to certain slices. The slices may be identified by an S-NSSAI. In another alternative, the DNN Replacement Rule information element may indicate to the UE that the replacement rules only apply to certain slices.

As described above, a DNN Replacement Rule may indicate to the UE that the rule is only valid under certain conditions. For example, the rule may include an indication that the rule is only valid in a certain location or when being applied to a PDU Session that is associated with a certain S-NSSAI. According to some aspects, it is possible for a DNN Replacement Rule to include other types of validity conditions. For example, the encodings that are shown in Table 5, Table 6, and Table 7 may be enhanced to allow the network to send other types of validity conditions to the UE. The other validity conditions may indicate to the UE that the DNN Replacement Rule should only be applied at certain times, should not be applied at certain times, should only be applied to an LADN, should never be applied to an LADN, should only be applied to DNN's that were provided by an application as part of an application descriptor, should not be applied to DNN's that were provided by an application as part of an application descriptor, should be applied to certain application types, should not be applied to certain application types, should only be applied to DNN's that were determined by evaluating an RSD, or should not be applied to DNN's that were determined by evaluating an RSD. For the purposes of applying this rule, the UE may consider any DNN that was received in the LADN Information element to be an LADN.

According to some aspects, DNN Replacement Rules may include a rule identifier, or a rule reference number. For example, the encodings that are shown in Table 5, Table 6, and Table 7 may be enhanced to allow the network to include a rule identifier or a rule reference number. When the UE uses a DNN Replacement Rule to select a DNN, the UE may provide the rule identifier or rule reference number to the network in order to indicate to the network that DNN Replacement was performed and to further indicate what specific rule was applied.

According to some aspects, DNN Replacement Rules may also indicate that an "Original DNN" is not allowed and may be replaced with no DNN. In other words, the UE may not attempt to establish a PDU Session to the DNN.

According to some aspects, DNN Replacement Rules may also indicate that an "Original DNN" is not allowed and that the UE should include no DNN in the PDU Session Establishment request instead of including the "Original DNN" so that the network will establish the PDU Session with a default DNN.

According to some aspects, the DNN Replacement Rules that the AMF sends to the UE may be received by the AMF from the PCF. For example, the AMF may invoke the Npcf_UEPolicyControl_Create Request service and receive the DNN Replacement Rules in the response. The DNN Replacement Rules that the AMF sends to the UE may be received by the AMF from the UDM. For example, the DNN Replacement Rules may be part of the UE's subscription information and the AMF may invoke the Nudm_SDM_Get Request service and receive the DNN Replacement Rules in the response.

Coordination of Support of DNN Replacement Rules Between the UE and Network

According to some aspects, a UE might not support the ability to receive DNN Replacement Rules. When such a non-supporting UE receives DNN Replacement Rules, it may not understand the information element encoding and discard, or ignore, the information. This is not a desirable situation because, if the UE ignores the DNN Replacement Rules, the UE will attempt to use DNNs in a way that is not expected by the network. For example, this might cause the UE to attempt to establish a PDU Session towards a DNN in an area where a more optimal DNN is available. For example, this might cause the UE to attempt to establish a PDU Session towards a DNN in an area where the DNN is not available.

According to some aspects, in order to avoid sending DNN Replacement Rules to non-supporting UE's, the UE may indicate to the network that it supports receiving DNN Replacement Rules or indicate to the network that it desires to receive DNN Replacement Rules. This indication may be sent from the UE to the AMF in the Network in a Registration Request. The indication may be called DNN Replacement Rules Indication.

According to some aspects, the DNN Replacement Rules Indication may be an indication that the UE supports receiving and applying DNN Replacement Rules and it may further provide Original DNNs to the network. The Original DNNs that are provided in the DNN Replacement Rules Indication may be DNNs that the UE may be configured to use and/or anticipates using. The network may determine which DNN Replacement Rules to send to the UE based on the Original DNNs that were provided by the UE to the AMF in the DNN Replacement Rules Indication. According to some aspects, the advantage of having the UE provide the Original DNNs to the AMF in the DNN Replacement Rules Indication is that the network can use this information to determine to reduce the number of DNN Replacement Rules that it sends to the UE. For example, the network may determine to only send the UE DNN Replacement Rules that are associated with Original DNNs that were provided by the UE in the DNN Replacement Rules Indication.

Table 8 illustrates an example encoding of a DNN Replacement Rules Indication Information element. This information element may include 0 or more Original DNN values. Table 9 provides further descriptions of the encodings shown in Table 8.

TABLE 8

DNN Replacement Rules Indication Information Element Encoding

| 8 | 7 | 6 | 5 | 4 | 3 | 2 | 1 | |
|---|---|---|---|---|---|---|---|---|
| | DNN Replacement Rules Indication IEI | | | | | | | octet 1 |
| | Length of DNN Replacement Rules Indication contents | | | | | | | octet 2 |
| | | | | | | | | octet 3 |
| | Original DNN value 1 | | | | | | | octet 4* |
| | | | | | | | | octet a* |
| | Original DNN value 2 | | | | | | | octet a + 1* |
| | | | | | | | | octet b* |
| | . . . | | | | | | | octet b + 1* |
| | | | | | | | | octet g* |
| | Original DNN value n | | | | | | | octet g + 1* |
| | | | | | | | | octet h* |

TABLE 9

DNN Replacement Rules Indication

Value part of the DNN Replacement Rules Indication information element is in octet 4 to h. The value part of the DNN Replacement Rules Indication information element consists of zero or more Original DNN values. When there are zero Original DNN values, the information element is reduced to only the DNN Replacement Rules Indication IEI, e.g., the Length field does not exist.

Original DNN value:

The Original DNN value is coded as the length and value part of DNN information element as specified in subclause 9.11.2.1B of TS 24.501 [5] starting with the second octet.

Receiving DNN Replacement Rules at the UE

According to some aspects, DNN Replacement Rules (e.g., the information that is described in Table 5, Table 6, and Table 7) may be sent to the UE from the AMF. The AMF may send the DNN Replacement Rules to the UE in the Registration Accept message.

According to some aspects, when the UE sends a Registration Request to the network, the UE may indicate to the network that the UE supports receiving DNN Replacement Rules. For example, the UE may include the DNN Replacement Rules Indication (e.g., the information that is described in Table 8 and Table 9) to the AMF in the Registration Request message. The presence of the DNN Replacement Rules Indication information element in the Registration Request message may be an indication from the UE to the network that the UE supports receiving and applying DNN Replacement Rules. The inclusion of optional Original DNN values in the DNN Replacement Rules Indication information element may help the network determine which DNN Replacement Rules to send to the UE.

When the AMF receives the DNN Replacement Rules Indication from the UE, the AMF may store the indication as part of the UE configuration. The AMF may subsequently determine to send new DNN Replacement Rules to the UE when the AMF receives new DNN Configuration information. For example, DNN Configuration information may be received from the OAM system and used by the AMF to create DNN Replacement Rules. The AMF may use the DNN Replacement Rules Indication in the UE's AMF context to determine whether or not to send updated DNN Replacement Rules to the UE. The AMF may send the updated DNN Replacement Rules to the UE in a UE Configuration Update procedure. The AMF may consider the slices in the UE's Allowed NSSAI, Requested NSSAI, and Configured NSSAI when determining what DNN Replacement Rules to send to the UE.

Alternatively, the DNN Configuration information may be received from the UDM/UDR after the UDM/UDR receives the DNN Configuration information from the NEF. The NEF may receive the DNN Configuration Information when the AF Traffic Influence API is invoked.

According to some aspects, the AMF may detect other events that will trigger the AMF to send DNN Replacement Rules to the UE. For example, the AMF may receive an NAS message from the UE and the NAS message may indicate that the UE desires to establish a PDU Session to a certain DNN or to modify a PDU Session to a DNN. The AMF may determine that, if the UE had properly applied DNN Replacement Rules, then the UE would have replaced the provided DNN and would have included a different DNN in the NAS Message. The AMF may then reject the PDU Session Establishment request. The AMF may also determine that the UE's DNN Replacement Rules might not be up to date and the AMF may determine to send the UE a UE Configuration Update message with up-to-date DNN Replacement Rules. In another example, the UE may provide the AMF with a DNN Replacement Rule Identifier or DNN Replacement Rule Reference Number during PDU Session establishment. The AMF may determine that the DNN Replacement Rule Identifier or DNN Replacement Rule Reference Number is out of date or that a different rule should have been applied. AMF may then reject the PDU Session Establishment request and send updated DNN Replacement Rules to the UE. In yet another example, the AMF may obtain from UDM/UDR DNN Replacement Rules to send to the UE during Registration procedure if the UE's subscription information indicates the UE supports DNN replacement.

When a PDU SESSION ESTABLISHMENT Request or PDU MODIFICATION Session Request is rejected and the AMF determines that DNN Replacement Rules in the UE need to be replaced, the AMF may provide the UE with an indication that the UE may attempt PDU Session Establishment or PDU Session Modification again only after receiving new DNN Replacement Rules.

PDU Session Establishment or PDU Session Modification Considerations when Applying DNN Replacement Rules According to some aspects, it may be desirable for the network (e.g., the AMF or SMF) to determine whether the UE performed DNN replacement. For example, if the network sends DNN Replacement Rules to the UE and the UE previously provided no indication to the network that the UE supports receiving and applying DNN Replacement rules, then the network may not know if the DNN Replacement rules were provided. It is proposed that the UE may indicate to the network, during PDU Session Establishment or PDU Session Modification procedure, whether the DNN that is being requested in the PDU Session Establishment request message or in the PDU Session Modification request message is a replacement name. This indication may be used by the network to avoid evaluating the requested DNN name to determine whether replacement is required in the network (e.g., by the AMF).

According to some aspects, when the UE sends a PDU Session Establishment Request or PDU Session Modification Request to the AMF, the message is carried inside of an UL NAS TRANSPORT message. The UL NAS TRANSPORT message also carries the DNN that is associated with the PDU Session Establishment Request. According to some aspects, the UL NAS TRANSPORT message may be enhanced to also include an optional "Original DNN" field. The presence of the "Original DNN" information element in the UL NAS TRANSPORT message may be an indication to the AMF that the DNN Replacement was performed by the UE and the value of the "Original DNN" information element in the UL NAS TRANSPORT message may indicate to the AMF the DNN value that was replaced.

According to some aspects, the UE may also provide the network with a DNN Replacement Rules identifier or DNN Replacement Rules Reference Number in the UL NAS TRANSPORT message. The DNN Replacement Rules identifier or DNN Replacement Rules Reference Number serves as an indication to the AMF that DNN Replacement Rules were applied and an indication of what DNN Replacement Rules were applied.

According to some aspects, if the AMF receives no "Original DNN" information element in the UL NAS TRANSPORT message and the AMF previously received no indication of support from the UE (e.g., the DNN Replacement Rules Indication information element), then the AMF may evaluate the DNN that was provided in the UL NAS TRANSPORT message for the PDU session to determine if it requires replacement. The evaluation operation may require interaction with the PCF to obtain DNN Replacement rules and interaction with the SMF to perform SMF selection.

According to some aspects, the SMF that is selected to serve the PDU Session may also be provided with the "Original DNN" value. The AMF may provide this value to the SMF when the AMF invokes the Nsmf_PDUSession_CreateSMContext Request service operation or the UE may provide this value to the SMF by including it in the PDU Session Establishment Request part of the message. The SMF may use this information to identify the application type(s) that are associated with the PDU Session and the types of data network that the traffic should be routed towards. This information may be used by the SMF to help select a UPF to serve the PDU Session. Furthermore, the SMF may monitor the UE's location and change the UPF and/or DNN that is associated with the PDU Session if the SMF determines based on the UE's location that a more optimal UPF or DNN may be available.

When the SMF determines that there is a more optimal DNN to serve the UE's PDU Session, the SMF may send a PDU SESSION MODIFICATION COMMAND to the UE to indicate to the UE that the PDU Session is now associated with a new DNN.

According to some aspects, when the SMF determines that there is a more optimal DNN to serve the UE's PDU Session, the SMF may send a PDU SESSION MODIFICATION COMMAND to request that the UE reevaluates the DNN Replacement Rules that are associated with the PDU Session. If the UE determines that a more optimal DNN may be associated with the application traffic, the UE may then trigger a PDU SESSION MODIFICATION REQUEST or the UE may release the PDU Session and establish a new PDU Session with a new DNN that is determined with the DNN Replacement Rules.

According to some aspects, starting with the SMF determination that a different DNN should be applied, may be used also with the mechanism described in the "Enhancements to AF traffic influence" clause. For example, the SMF may make this determination when the DNN Replacement procedure is initiated in the CN by the AF traffic influence procedure Procedure to Support Reception and Application of DNN Replacement Rules According to some aspects, FIG. 9 shows a representation of how a UE may receive and apply DNN Replacement Rules.

In Step 1, the UE may send a Registration Request to the network. The Registration Request may include the DNN Replacement Rules Indication Information Element that is described above and shown in Table 8 and Table 9.

In Step 2, the UE may invoke Nudm_SDM_Get and indicate to the UDM that the UE supports receiving DNN Replacement Rules. The Nudm_SDM_Get may reply and provide the AMF with DNN Replacement Rules. The content of the DNN Replacement Rules may be as shown in Table 5, Table 6, and Table 7. As previously described and as an alternative to the UE providing the DNN Replacement Rules Indication to the AMF in step 1, the UDM may provide the DNN Replacement Rules to the AMF based on information of the UE's support for DNN replacement in the UE's subscription information stored in the UDM.

In Step 3, the AMF may send a Registration Response to the UE and the Registration Response may include the DNN Replacement Rules Information Element as shown in Table 5, Table 6, and Table 7.

In Step 4, the UE's subscription information may be updated and new DNN Replacement Rules may be sent to the AMF for the UE.

In Step 5, the AMF may send a UE Configuration Update to the UE and the new DNN Replacement Rules may be sent in a DNN Replacement Rules Information Element as shown in Table 5, Table 6, and Table 7.

In Step 6, the UE may send a UL NAS TRANSPORT message to the AMF. The UL NAS TRANSPORT message may include a PDU SESSION ESTABLISHMENT Request.

As described above, the UL NAS TRANSPORT message may include an "Original DNN" information element. This message may be triggered by an application generating application layer traffic and providing a DNN to the UE as part of the traffic descriptor. The DNN that was provided by the application would be the "Original DNN" that was described earlier.

In Step 7, the AMF will invoke Nsmf_PDUSession_CreateSMContext and provide the PDU SESSION ESTABLISHMENT request to the AMF and provide the "Original DNN" to the SMF. According to some aspects, the UE may have provided the "Original DNN" in the PDU SESSION ESTABLISHMENT request rather than in the UL NAS TRANSPORT message.

In Step 8, the SMF responds to the UE with a Nsmf_PDUSession_CreateSMContext Response message.

In Step 9, the UE receives a DL NAS TRANSPORT message which carries the PDU SESSION ESTABLISHMENT accept.

In step 10, the UE sends application traffic over the PDU Session. The application traffic is sent to a data network that is associated with the replacement DNN.

Applying DNN Replacement Rules to LADNs

According to some aspects, the DNN Replacement Rules may come from the UE's subscription or from a PCF in the HPLMN. LADN Information that is sent to the UE may come from the serving PLMN. For example, the PLMN that creates the DNN Replacement Rules and the PLMN that creates an LADN Information may be different and it may be undesirable for the UE to apply the DNN Replacement Rules to a DNN that is received in LADN Information. In order to avoid conflicts between LADN Information and DNN Replacement Rules, the UE may be configured to not apply DNN Replacement Rules to a DNN that is derived from a LADN Information element.

According to some aspects, the LADN Information Element may be updated so that the network can indicate to the UE whether DNN replacement rules should be applied to an LADN DNN. In another alternative, the UE may be configured to only apply the DNN Replacement Rules to an LADN DNN if the UE is not in the service area of the LADN.

Instructing the UE when to Apply a DNN Replacement Rule

According to some aspects, the format of the RSD or Traffic Descriptor in the URSP Rule may be enhanced so that the network can include an indication if the DNN that was provided in the Traffic Descriptor may not be replaced. If a non-supporting UE receives a URSP rule with this new "Do Perform DNN Replacement" indication, the non-supporting UE will ignore the URSP Rule because it contains a parameter that it does not understand. Thus, the network may account for backwards compatibility by sending the UE a URSP rule with the new "Do Perform DNN Replacement" indication and a lower priority version of the URSP Rule without the "Do Perform DNN Replacement" indication. According to some aspects, a non-supporting UE may always apply the URSP Rule without the new "Do Perform DNN Replacement" indication and ignore the URSP Rule that it does not understand, and a supporting UE will always apply the higher priority URSP rule that includes the new "Do Perform DNN Replacement" indication.

According to some aspects, the network may indicate to the UE that DNN Replacement is required by including a DNN in both the Traffic Descriptor and RSD parts of the URSP Rule. According to some aspects, the network may provide a "DNN Replacement Evaluation Required" indication in the Traffic Descriptor or RSD parts of the URSP Rule to indicate to the UE that the URSP Rule requires that the DNN Replacement Rules also be evaluated with the URSP Rule. For example, the URSP Rules that are determined via URSP evaluation is subject to DNN Replacement. If a non-supporting UE receives a URSP rule with this new "DNN Replacement Evaluation Required" indication, the non-supporting UE may ignore the URSP Rule because it contains a "DNN Replacement Evaluation Required" indication that it does not understand. Thus, according to some aspects, the network may account for backwards compatibility by sending the UE a URSP rule with the new "DNN Replacement Evaluation Required" indication and a lower priority version of the URSP Rule without the "DNN Replacement Evaluation Required" indication. According to some aspects, a non-supporting UE may always apply the URSP Rule without the new indication and ignore the URSP Rule that it does not understand, and a supporting UE may always apply the higher priority URSP rule that includes the new "DNN Replacement Evaluation Required" indication.

According to some aspects, the network may indicate to the UE that DNN Replacement is required by including one or more DNN Replacement Rule Identifier or Rule Reference Number in a new field in the URSP rule. For example, the identifier or reference number may link the DNN replacement functionality with the URSP rule and indicate to the UE that DNN replacement should be performed.

Conveying Application Requirements to the Core Network

An AF/SMF may trigger an EAS relocation process based on internal information such as congestion condition, failure of an EAS itself, or UE mobility. Once the target DNAI is determined, the SMF may select a new local PSA and establish a session with the new local PSA. When the SMF sends N6 traffic routing information to the new local PSA, the SMF also indicates the local PSA to buffer the uplink data.

Each UE application may have its own requirements. Depending upon the type of application, the application may have a latency tolerance or minimal data rate to function at an acceptable level. According to some aspects, these application characteristics may vary from one application to another.

According to same aspects, it may be appropriate for the core network to have information on each application's requirements. For example, this information may be used by the network to determine if and when to direct the UE's traffic towards particular edge data networks (e.g., identified by DNAI).

According to some aspects, the following UE application information may be conveyed to the core network by the UE, the following mechanisms may be used by the UE to convey such information to the core network and the following method may use the information for graceful EAS relocation.

UE Application Requirement Information

UE application requirement information may include but not limited to the information depicted in Table 10.

TABLE 10

UE Application Requirement Information

| UE Application Data | Description |
| --- | --- |
| Application ID | An alphanumeric identity of the application. |
| Application type | Application category name that characterizes rank, sensitivity, quality etc., of an application. E.g., low latency, emergency, game, etc. |

TABLE 10-continued

UE Application Requirement Information

| UE Application Data | Description |
| --- | --- |
| Application SLA ID | An identifier that represents SLA agreement between application provider and the service provider/operator. |
| Acceptable latency | Maximum latency the service offered by the application can support. |
| Buffer length | Buffer time length with respect to service offered by application, which the application can support. |
| Buffer data size | Delayed data size due to buffer the application can work without sacrificing acceptable trade-off. |
| Location restriction | UE may need to be in certain location when the EAS relocation is done. Application may only be valid to receive service if UE is in certain location. |
| Time restrictions | length of time and actual time periods |
| 5QI | The 5QI of the application |

Conveying Application Requirement During PDU Session Establishment Procedure

Figure 2:
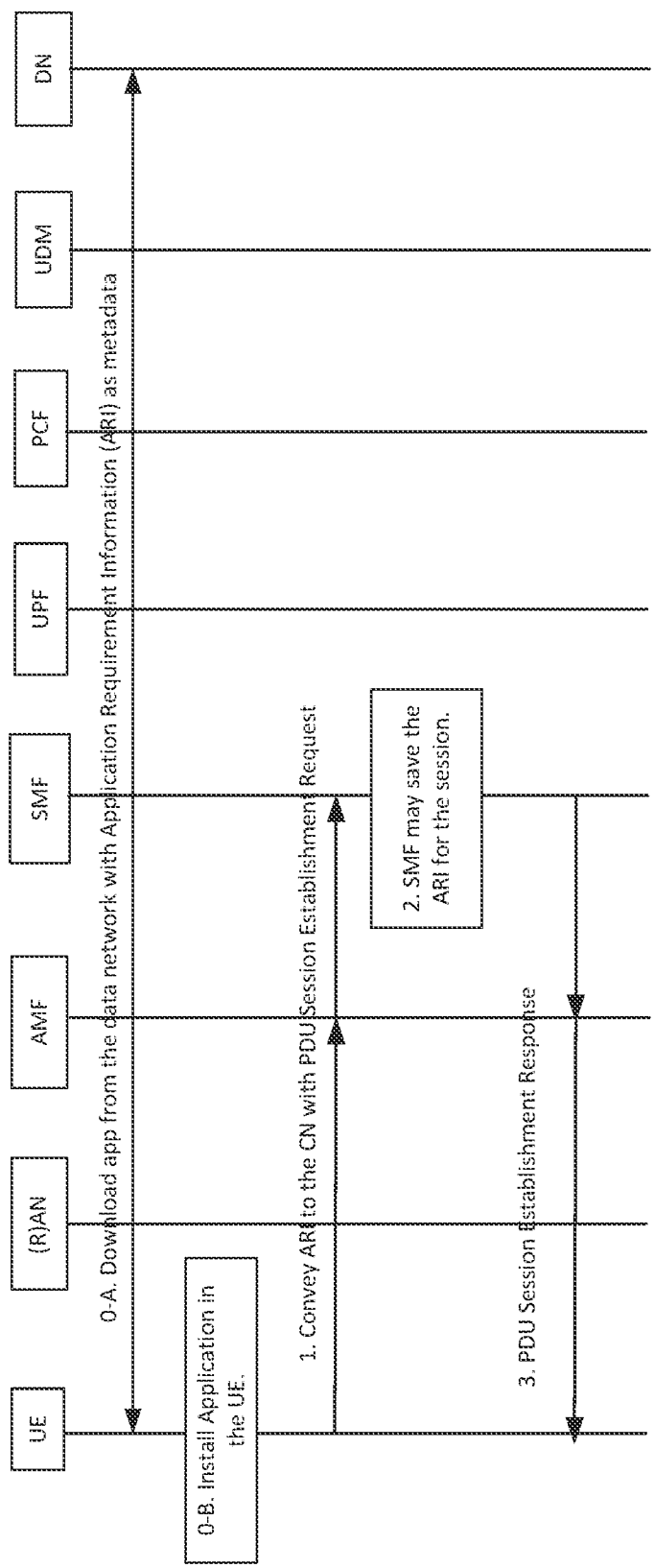
FIG. 2 shows an example of a UE application sending Application Requirement Information during a PDU session establishment process.

Application requirement information described in Table 10 may be conveyed to the core network during a PDU Session Establishment or PDU Session Modification procedure as described in FIG. 2.

In Step 0-A, a UE may download an application from the central data network (e.g., cloud, internet) or an edge network. The UE may also download only a part of application software (e.g., new version, update, etc.) or may request and receive authorization commands when installing an application software (e.g., for authenticity, integrity), whether the application software is downloaded from the data network or not.

Step 0-B may be independently carried out or may be performed in coordination with Step 0-A. In Step 0-B, the UE may also contact central data network for authorization or integrity check during the process of app installation.

In Step 1, the UE may send a request for PDU Session Establishment towards the SMF via AMF. This NAS message may include information such as the S-NSSAI and the UE Requested DNN. In addition, the UE NAS message may also include the requesting application's Application Requirement Information (ARI), which may comprise the application requirement data shown in Table 10. The UE may include multiple ARI information elements. Each ARI may be associated with one or more applications that use the PDU Session.

In Step 2, the SMF receives the ARI along with other information in the PDU Session Establishment message. The SMF may utilize the ARI information as needed. For example, if the requesting application's ARI includes an area restrictions to receive service for that application, the SMF may update the local policy and enforce the restrictions, which may mean even rejecting the PDU Session Establishment Request. The SMF keeps the other ARI in local storage at least for the life-time of a PDU session so that the information may be used when needed. For example, buffer time length may only be used during EAS relocation. Alternatively, the SMF may also use UDM to store the ARI and retrieve when needed. The ARI may be used by the SMF to determine when and if Edge Relocation procedures need to be initiated.

In Step 3, the SMF may send back a PDU Session Accept message back to the UE.

Using ARI During EAS Relocation

Figure 3:
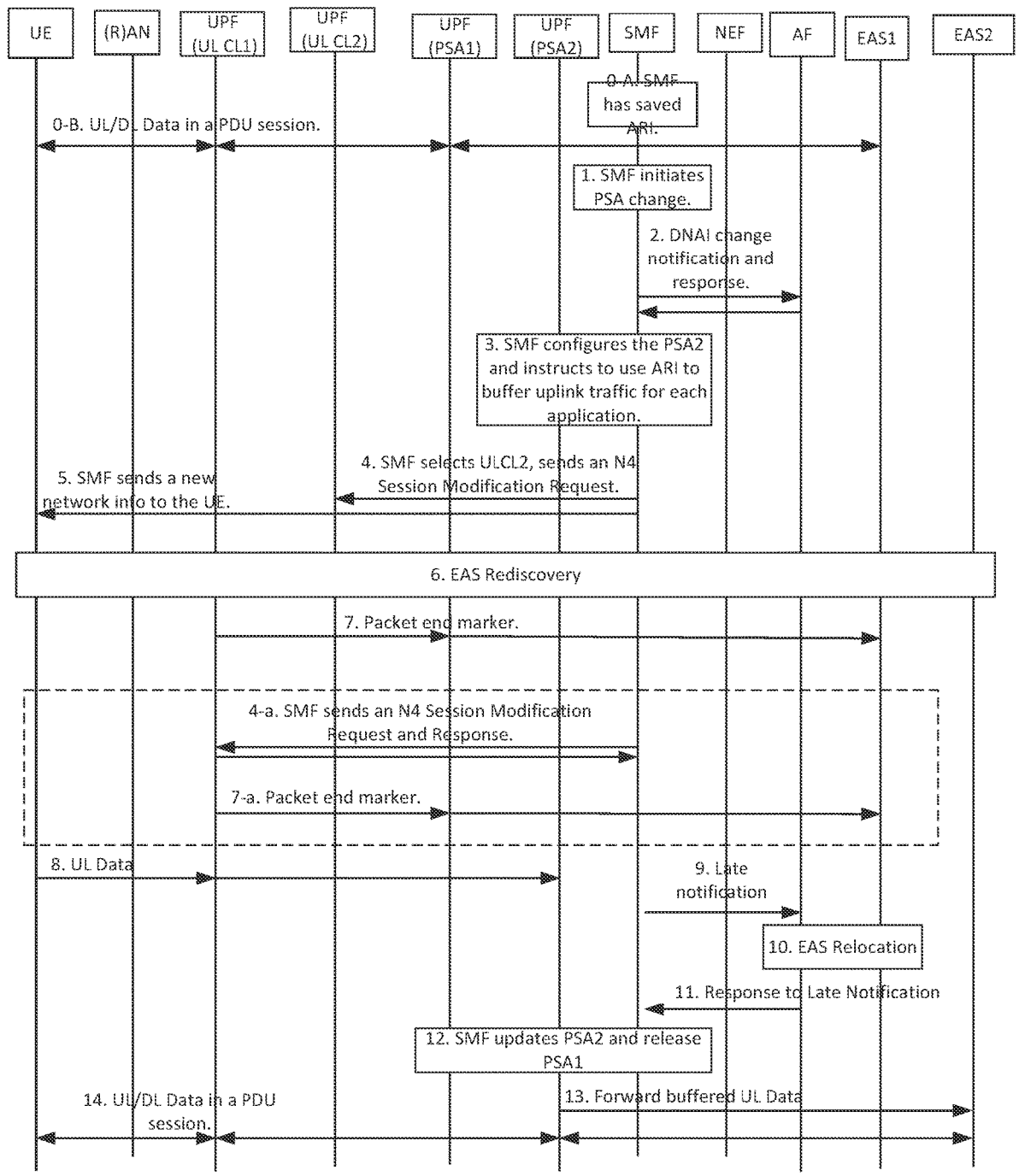
FIG. 3 shows an example of storing SMF and conveying ARI for each application to the PSA UPF.

FIG. 3 describes a procedure where the SMF sends the ARI received from the UE (see FIG. 2) to the PSA2 UPF during the EAS relocation process, where ARI for each application is enforced. Additionally, the SMF may also change/update the UL CL to optimize the PDU session procedure based on the ARI.

In Step 0-A, the SMF saves the ARI received from the UE (See FIG. 2).

In Step 0-B, UE has an ongoing PDU session where UL/DL data is being exchanged among UE, UL CL1 UPF, PSA1 UPF and EAS1.

In Step 1, provided that edge relocation is needed, the SMF determines the need to change the local PSA for the PDU session(s). The SMF may make this determination based on reporting data provided by the UPF on the N4 interface that the ARI is not being met. Alternatively, the SMF may make this decision based on an indication reporting data provided by an AF that the ARI is not being met.

In Step 2, SMF sends an early notification to the AF after it selects a target PSA (e.g., PSA2). The AF may indicate that buffering of uplink traffic in the PSA2 is required for a seamless edge application server relocation.

In Step 3, the SMF configures PSA2 as specified in step 2 of clause 4.3.5.6 of TS 23.502 and, conveys ARI for each application to PSA2 and instructs PSA2 to buffer uplink traffic for each application based on the ARI conveyed. PSA1 (e.g., source PSA) keeps receiving downlink traffic from EAS1 and sends it to the UE until it is released.

Additionally, based on the ARI received from the UE application, the SMF determines that a new ULCL be used and old ULCL (UL CL1) needs to be removed for better performance. SMF may select or initiate/start a UL CL2/Branching Point UPF function. The insertion of UL CL2/BP may depend on the application requirement and nature and volume of traffic from the UE. For example, if the UL data rate is high, the data is frequent, the application requirement mandates a hard latency criteria, and the old UL/CL is limited in its capacity and/or capability to handle such traffic, the ARI may trigger such insertion. The SMF may be able to set a threshold for data traffic and appreciate ARI from the UE to insert such UL CL UPF.

If new UL CL (UL CL2) is not inserted, the SMF may continue to use UL CL1 during the EAS relocation process. Hence, in such a case, all the functionalities of UL CL2 may be performed by UL CL1.

In Step 4, the SMF may select UL CL2 and send N4 Session Modification Request to the UL CL2 to convey the UL CL rules regarding the traffic flows. This may include information about SMF trying to move from PSA1 to PSA2.

In Step 5, the SMF modifies the PDU session such that the session is conducted through UL CL2 and PSA1.

In Step 6, UE may go through EAS rediscovery process based on information received in Step 5.

In Step 7, the UL CL2 UPF may send a Packet End Marker which indicates the end of PDU packets to PSA1, which then forwards it to the source EAS. After receiving the Packet End Marker, the source EAS stops handling packets and EAS relocation may begin.

Step 4-a is an alternative step for the case where UL CL/BP is not changed. In this case, the SMF sends an N4 Session Modification Request to the UL CL1 to update the rules regarding the traffic flows regarding the SMF trying to move from PSA1 to PSA2.

Step 7-a is an alternative step, e.g., in a case where UL CL/BP remains the same. In this case, the UL CL1 UPF may send a Packet End Marker to PSA1, which then forwards it to the source EAS. After receiving the Packet End Marker, the source EAS stops handling packets and EAS relocation may begin.

In Step 8, meanwhile, the UE may send UL data towards UL CL2 UPF, which may forward UL data to the PSA2. Based on ARI for each application, the PSA2 may establish buffer space and start buffering UL data for each application involved in the PDU session.

In Steps 9, 10 and 11, the SMF sends a Late Notification to the AF. When EAS relocation is completed, the AF sends a Late Notification response to the SMF.

In Step 12, the PSA1 is released and PSA2 is directed to send the UPF data towards EAS2 via N6 interface.

In Step 13, buffered data in PSA2 for each application is sent towards EAS2 via N6 interface.

Step 14 depicts that the PDU Session(s) is undertaken by UL CL2 and PSA2 UPFs. UL/DL packets from the UL CL2 may be exchanged with the PSA2 using N9 interface. PSA2 uses N6 interface for UL/DL traffic with EAS2.

Enhancements to AF Traffic Influence Procedures

According to some aspects, UE-based mechanisms for DNN replacement and providing application requirements for EAS relocation are provided. AF traffic influence procedure enhancements are also provided as alternatives for both DNN replacement and providing application requirements to the Core Network. According to some aspects, the provided enhancements using the AF traffic influence API or procedure may be implemented using other network exposure APIs as needed.

When EAS relocation is performed, an AF traffic influence procedure is triggered by a coordinating AF (e.g., EES), or by the source or target EAS. By augmenting the AF traffic influence request as shown in Table 11, the EAS may provide the information needed for the DNN replacement mechanism to occur in 5GC. Based on this proposal, the EAS may also provide, via the NEF, the parameters to be used by the CN when application relocation is performed. Note that Table 11 provides examples of parameters as buffering and latency, which may be provided in other formats, for example, the provided ARI.

TABLE 11

| | Traffic Influence AF request, e.g., based on TS 23.501 Table 5.6.7-1 | | | |
|---|---|---|---|---|
| Information Name | Applicable for PCF or NEF (NOTE 1) | | Applicable for NEF only | Category |
| Traffic Description | Defines the target traffic to be influenced, represented by the combination of DNN and optionally S-NSSAI, and application identifier or traffic filtering information. | | The target traffic can be represented by AF-Service-Identifier, instead of combination of DNN and optionally S-NSSAI. | Mandatory |

TABLE 11-continued

Traffic Influence AF request, e.g., based on TS 23.501 Table 5.6.7-1

| Information Name | Applicable for PCF or NEF (NOTE 1) | Applicable for NEF only | Category |
| --- | --- | --- | --- |
| Potential Locations of Applications | Indicates potential locations of applications, represented by a list of DNAI(s). | The potential locations of applications can be represented by AF-Service-Identifier. | Conditional (NOTE 2) |
| Target UE Identifier(s) | Indicates the UE(s) that the request is targeting, e.g., an individual UE, a group of UE represented by Internal Group Identifier (NOTE 3), or any UE accessing the combination of DNN, S-NSSAI and DNAI(s). | GPSI can be applied to identify the individual UE, or External Group Identifier can be applied to identify a group of UE. | Mandatory |
| Spatial Validity Condition | Indicates that the request applies only to the traffic of UE(s) located in the specified location, represented by areas of validity. | The specified location can be represented by a list of geographic zone identifier(s). | Optional |
| AF transaction identifier | The AF transaction identifier refers to the AF request. | N/A | Mandatory |
| Traffic Routing requirements | Routing profile ID and/or N6 traffic routing information corresponding to each DNAI and an optional indication of traffic correlation. | N/A | Optional |
| Application Relocation Possibility | Indicates whether an application can be relocated once a location of the application is selected by the 5GC. | N/A | Optional |
| UE IP address preservation indication | Indicates UE IP address should be preserved. | N/A | Optional |
| Temporal Validity Condition | Time interval(s) or duration(s). | N/A | Optional |
| Information on AF subscription to corresponding SMF events | Indicates whether the AF subscribes to change of UP path of the PDU Session and the parameters of this subscription. | N/A | Optional |
| DNN replacement information | Provides DNN replacement information to be applied for the traffic described by the Traffic Description IE | N/A | Optional |
| Application Relocation Parameters | Provides parameters to be used by the CN when application relocation is performed, e.g., buffering and latency requirements | N/A | Optional |

NOTE 1:
When the AF request targets existing or future PDU Sessions of multiple UE(s) or of any UE and is sent via the NEF, as described in clause 6.3.7.2, the information is stored in the UDR by the NEF and notified to the PCF by the UDR.
NOTE 2:
The potential locations of applications and traffic routing requirements may be absent only if the request is for subscription to notifications about UP path management events only.
NOTE 3:
Internal Group ID can only be used by an AF controlled by the operator.

Figure 4:
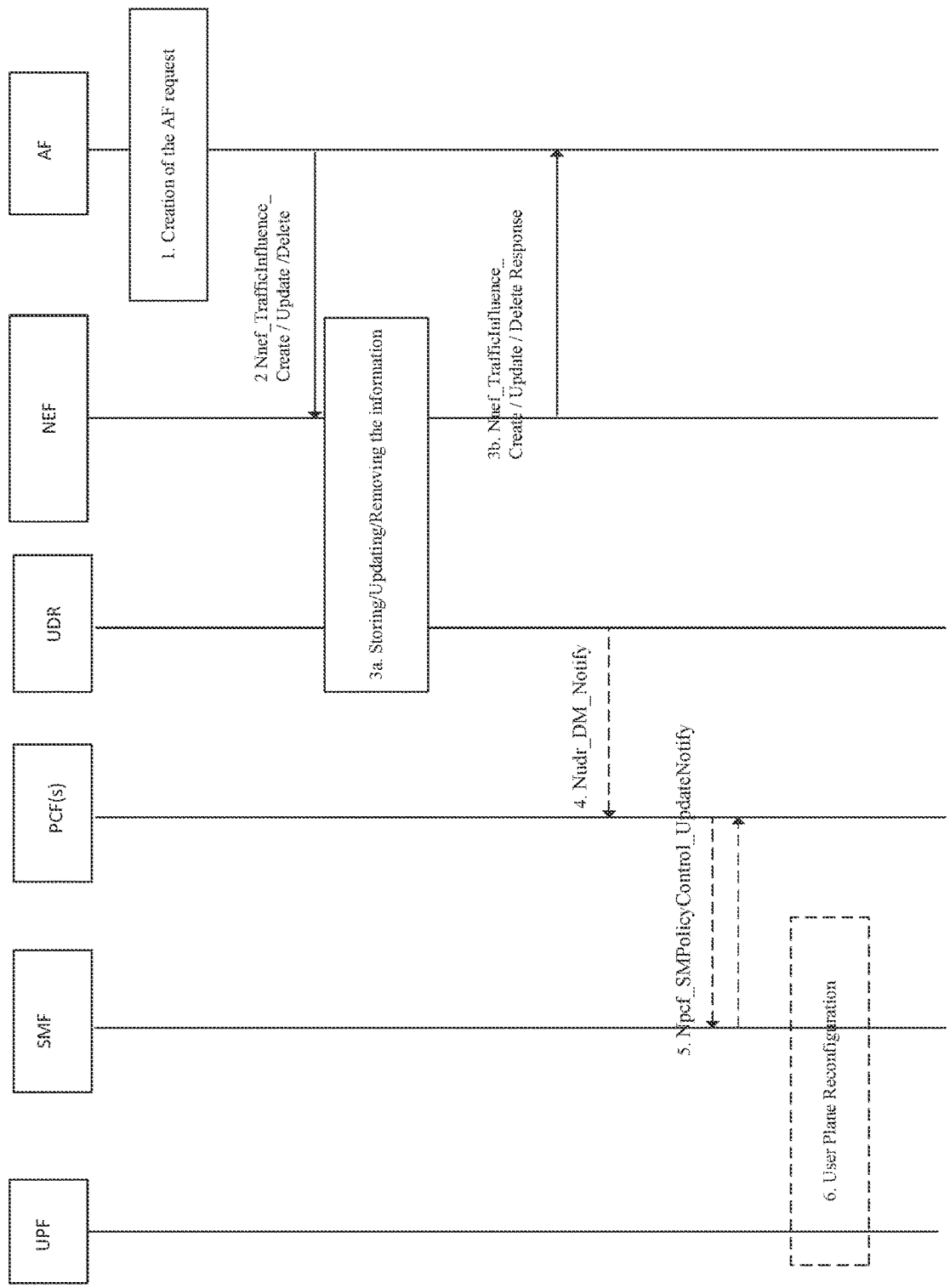
FIG. 4 shows an example of processing AF requests, e.g., based on 3GPP TS 23.502 clause 4.3.6.2.

The AF traffic influence may be used as described in 3GPP TS 23.502 clause 4.3.6.2 and shown in FIG. 4 with the following enhancements:

Following the storing of the information at the UDR, notifications are sent via the PCF to the SMF with the applicable PCC rules for DNN replacement and the application requirements for EAS relocation. The PCF provisions the DNN replacement decision to the AMF as described in TS 23.501.

The SMF may use the newly received information about the application requirements for EAS relocation to configure UPF. For example, the "Using ARI During EAS Relocation" procedure described earlier for ARI may be used also in this solution, when the ARI or other application requirements for EAS relocation are provided by the AF.

The SMF uses the newly received information to enhance the user plane reconfiguration in FIG. 4 step 6. For example, given EAS relocation requirements, the user plane reconfiguration may be based on the session continuity procedures detailed in TS 23.502 clause 4.3.5.

Figure 5:
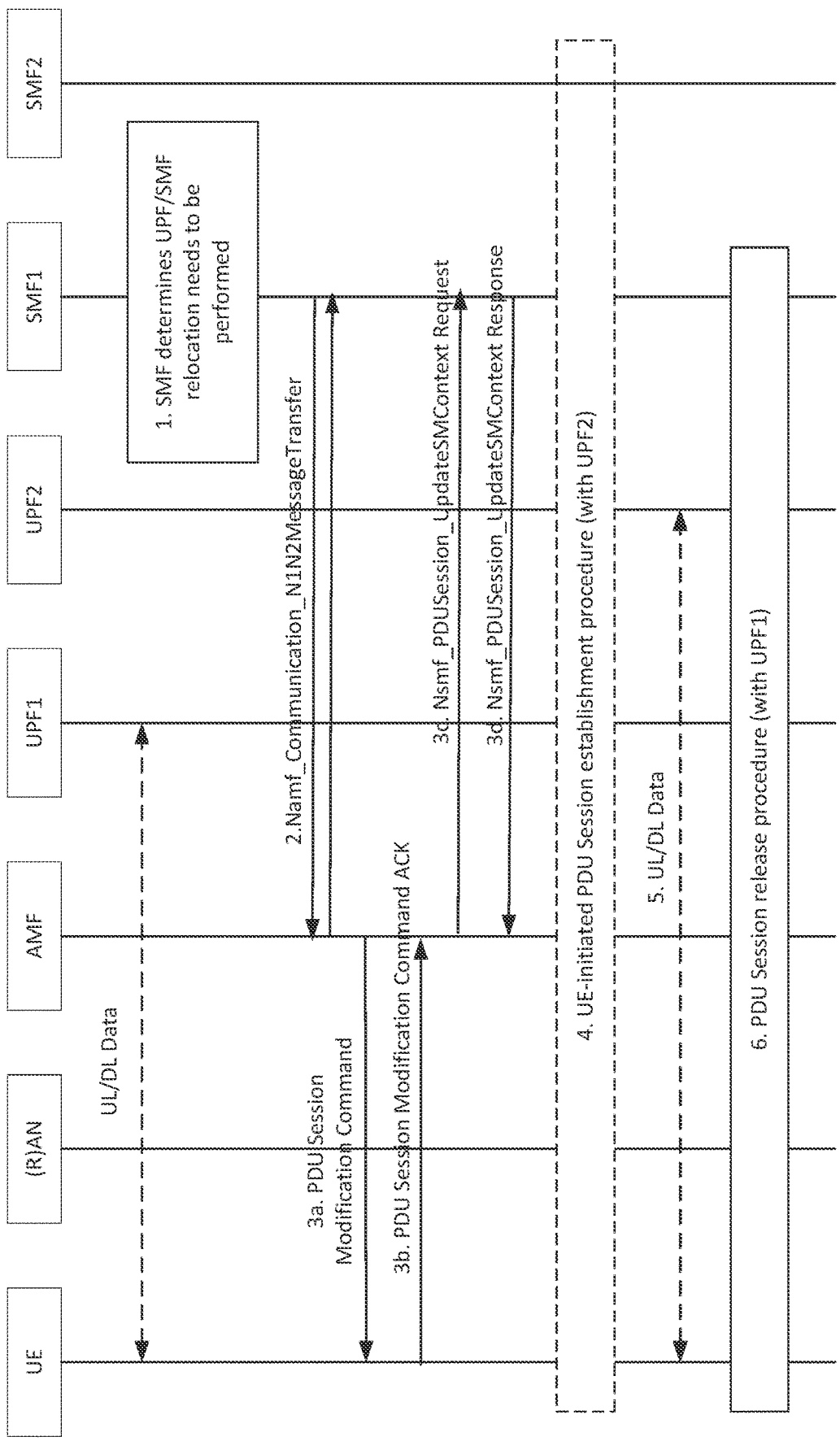
FIG. 5 shows an example of session continuity for SSC mode 3, e.g., based on TS 23.502 clause 4.3.5.2.

Using the SSC mode 3 example of the session continuity mechanism in TS 23.502 clause 4.3.5.2, step 6 (User Plane reconfiguration) in FIG. 4 may include the steps detailed in FIG. 5.

When applied to the EAS relocation case, in this procedure, in step 1, the SMF may also determine that the endpoint of the traffic flow changes, e.g., based on the AF traffic influence request. The proposed augmentation of the SF traffic influence request also provides the SMF with information about DNN replacement and application requirements for EAS relocation before the session continuity procedure is performed.

In steps 2 and 3 the SMF sends the DNN replacement information via the Namf_Communication_N1N2MessageTransfer and PDU Session modification command to the AMF and UE, respectively. This enables a DNN replacement mechanism to be used not only at PDU session establishment as detailed in TS 23.501, but also at EAS relocation. In addition, it allows the UE to be informed of the DNN replacement policy for future use, if the DNN replacement is not temporary or localized.

Flushing DNS Cache in the UE for EAS Discovery

Figure 6:
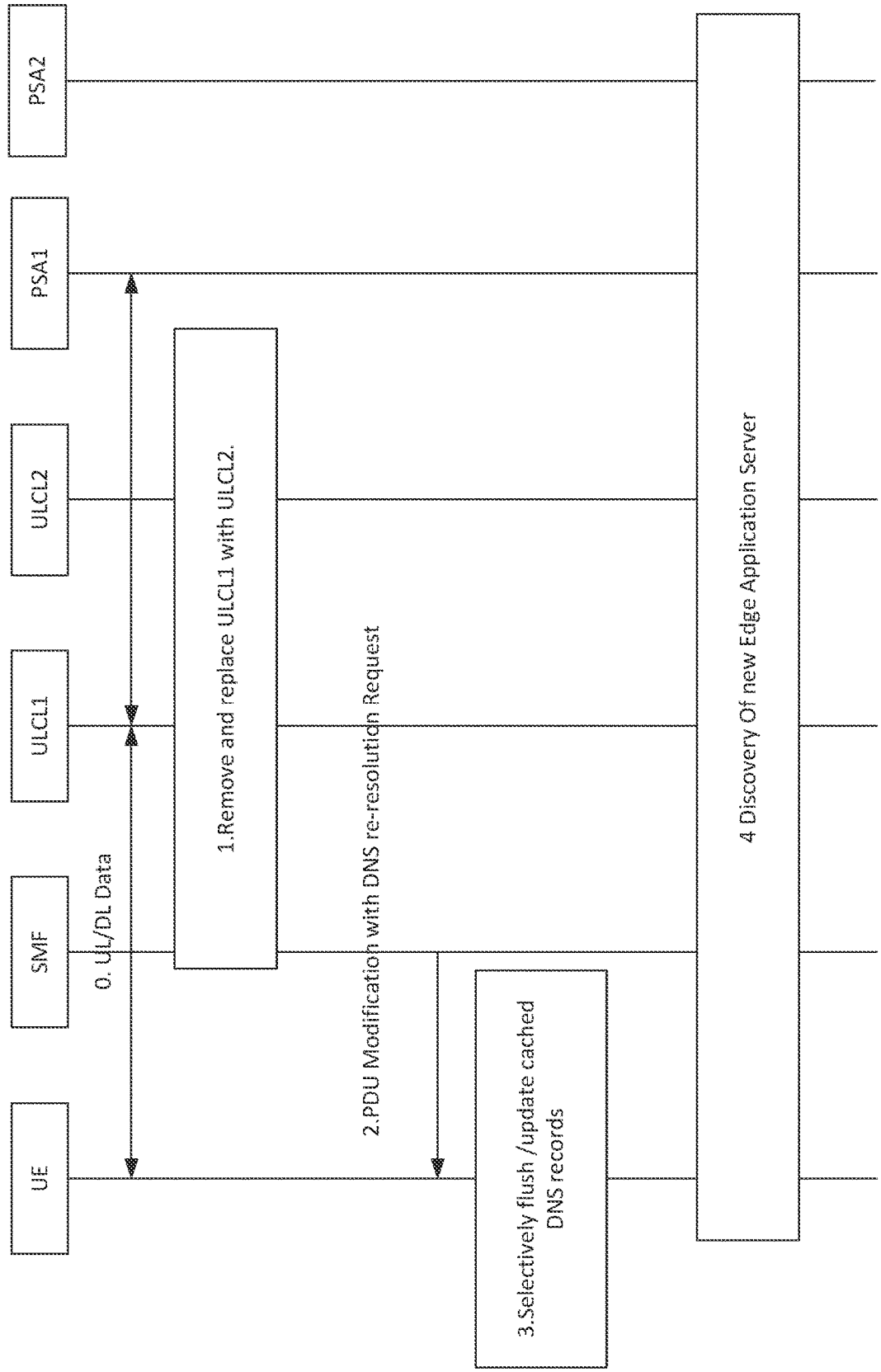
FIG. 6 shows an example of selective DNS cache flushing in the UE.

When the EAS providing services to the UE is relocated, the SMF may send an indication to the UE that a DNS cache flush operation is required. The DNS cache flush indication may be associated with additional information to help the UE to determine which DNS cache entries should be flushed. For example, the DNS cache flush indication may be associated with FQDNs whose entries should be flushed while other entries need not be. UE DNS cache flushing methods are described in FIG. 6.

In Step 0, UL/DL data is being exchanged between the UE and an edge network/EAS using UL CL1 and PSA1.

In Step 1, SMF determines that the path using ULCL1 and PSA1 may not be ideal as UE moves. The SMF may have detected that the UE entered a new location. The SMF decides that new PSA UPF (PSA1) be used and may insert UL CL2.

In Step 2, the SMF may send, to the UE, an EAS rediscovery indication which includes DNS re-resolution indication and its optional associated impact field within NAS message via a PDU Session Modification Command. The optional associated impact field may include area information, network information such as IP segment, subnet information, a list of FQDNs and/or DNS suffixes for the new edge servers(s) whose cache entries should be flushed.

In Step 3, the UE may replace or flush (e.g., remove) the DNS records that are associated with the request of step 2. According to some aspects, the DNS cache flushing procedure may depend on a predefined algorithm, wherein the algorithm identifies network information received in the associated impact field (via NAS messaging) and may selectively replace/remove the DNS cache records.

In Step 4, the UE may discover new EAS using new ULCL (ULCL2) and PSA2.

GUI

Figure 7:
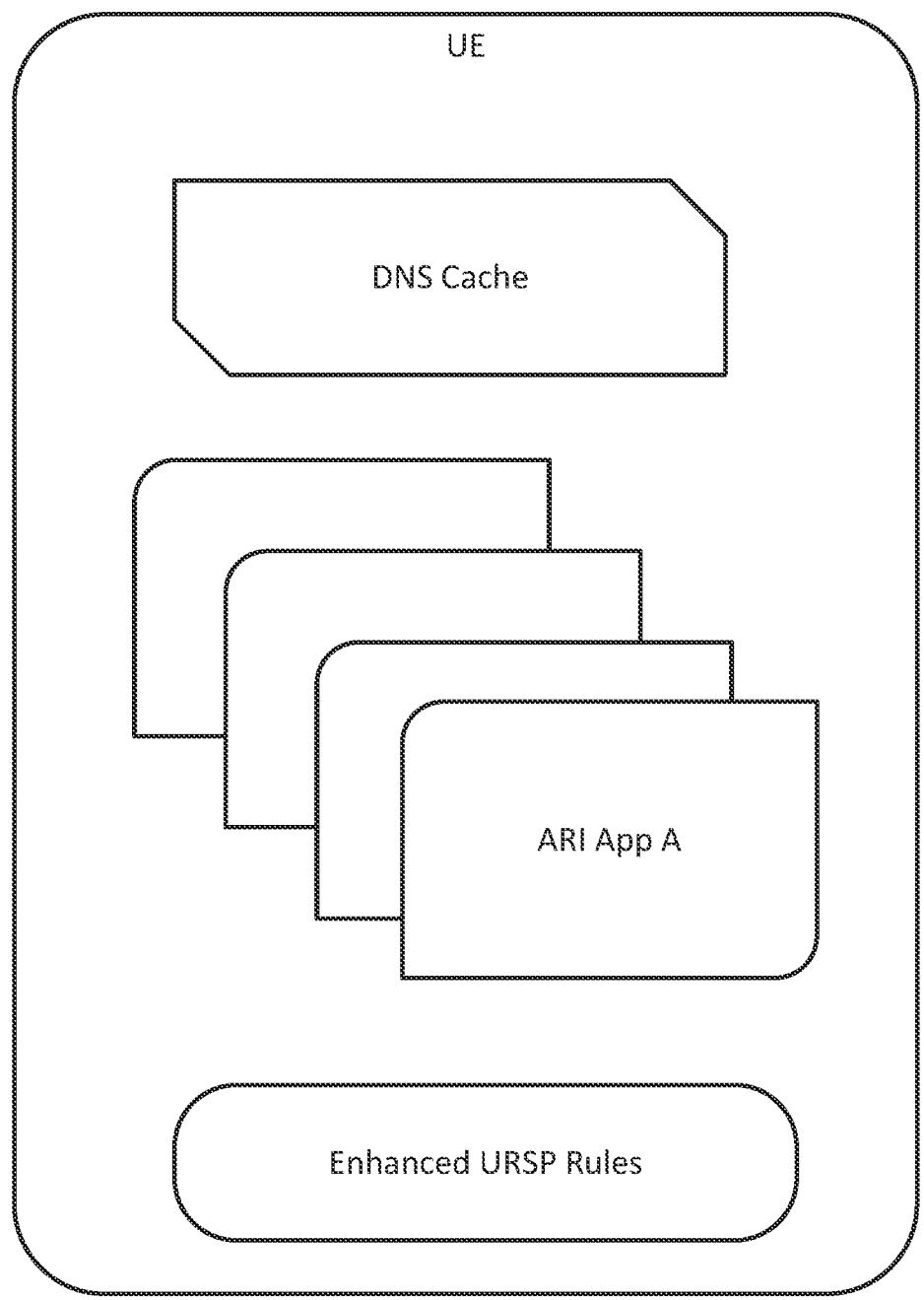
FIG. 7 shows an example of a UE depicting enhanced URSP, ARI for each app and DNS cache.
Figure 8:
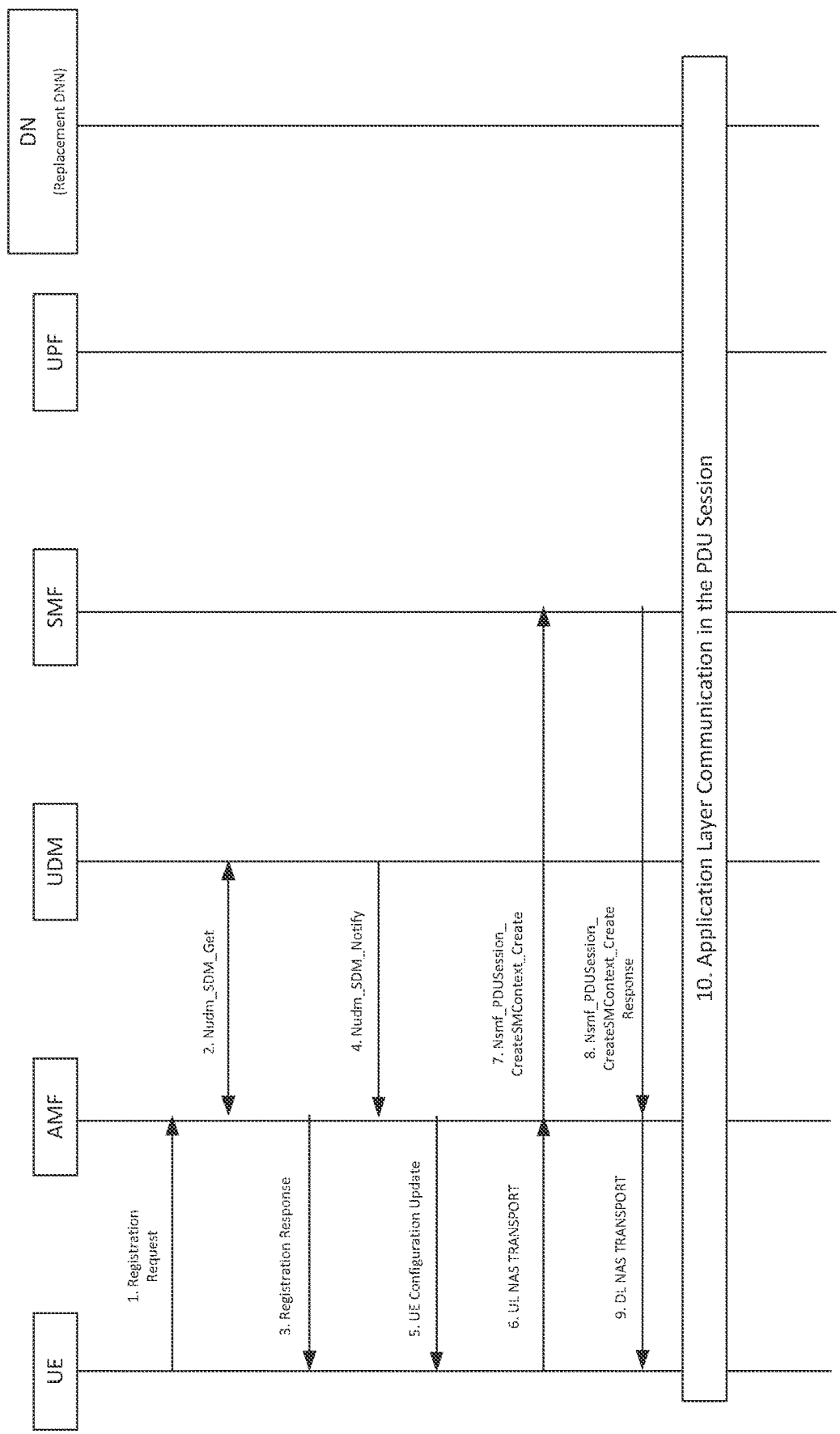
FIG. 8 illustrates an example procedure to support reception and application of DNN Replacement Rules.

FIG. 7 shows a UE with DNS cache which needs selective flushing, Application Requirement Information (ARI) for each application and, URSP rules with enhanced RSD. ARI for each application may be downloaded when downloading and installing applications.

Example Communications System

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 9A:
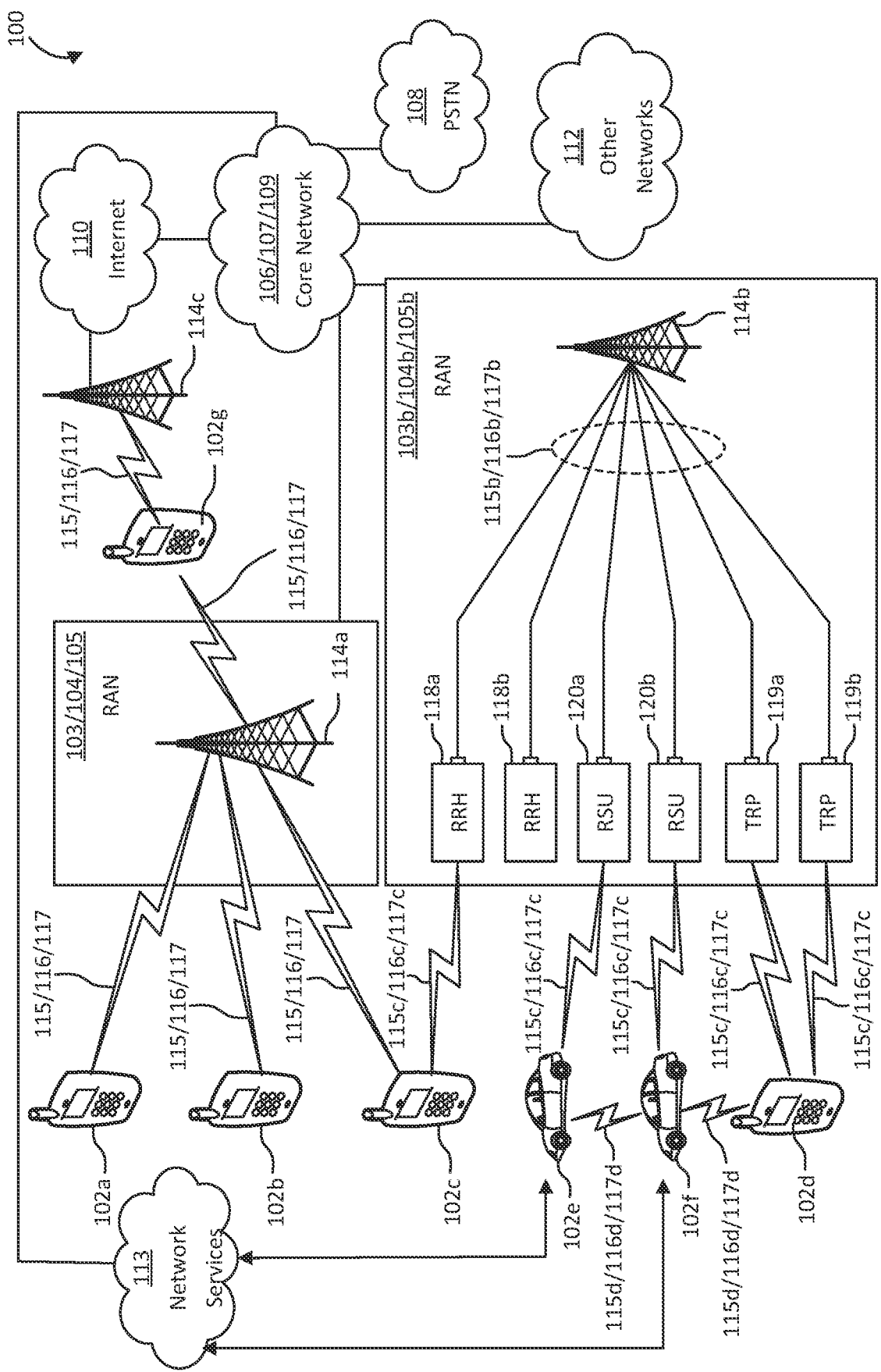
FIG. 9A illustrates an example communications system.

FIG. 9A illustrates an example communications system 100 in which the systems, methods, and apparatuses described and claimed herein may be used. The communications system 100 may include wireless transmit/receive units (WTRUs) 102*a*, 102*b*, 102*c*, 102*d*, 102*e*, 102*f*, and/or 102*g*, which generally or collectively may be referred to as WTRU 102 or WTRUs 102. The communications system 100 may include, a radio access network (RAN) 103/104/105/103*b*/104*b*/105*b*, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 9A, each of the WTRUs 102 is depicted in FIGS. 9A-9E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114*a* and a base station 114*b*. In the example of FIG. 9A, each base stations 114*a* and 114*b* is depicted as a single element. In practice, the base stations 114*a* and 114*b* may include any number of interconnected base stations and/or network elements. Base stations 114*a* may be any type of device configured to wirelessly interface with at least one of the WTRUs 102*a*, 102*b*, and 102*c* to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 119A, 119B, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 119A, 119B may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 119A and 119B, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 119A, 119B, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 119A, 119B, TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 119A and 119B, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 119A and 119B, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 9A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell. As shown in FIG. 9A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 9A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 9A may be configured to communicate with the base station 114a, which may employ a cellular-based radio technology, and with the base station 114c, which may employ an IEEE 802 radio technology.

Although not shown in FIG. 9A, it will be appreciated that a User Equipment may make a wired connection to a gateway. The gateway may be a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 9B:
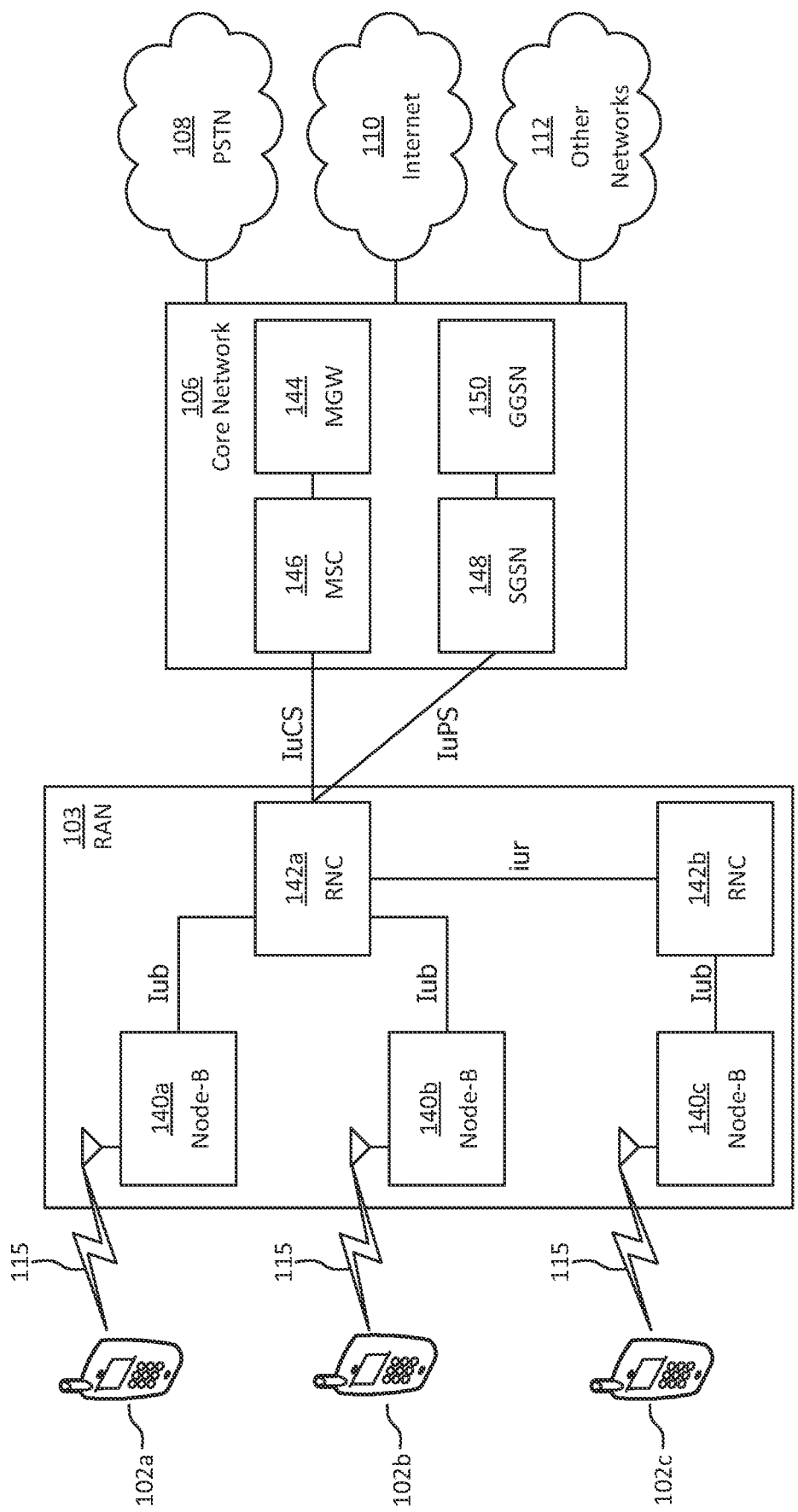
FIGS. 9B, 9C, and 9D are system diagrams of example RANs and core networks.

FIG. 9B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 9B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 9B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 9B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 9C:
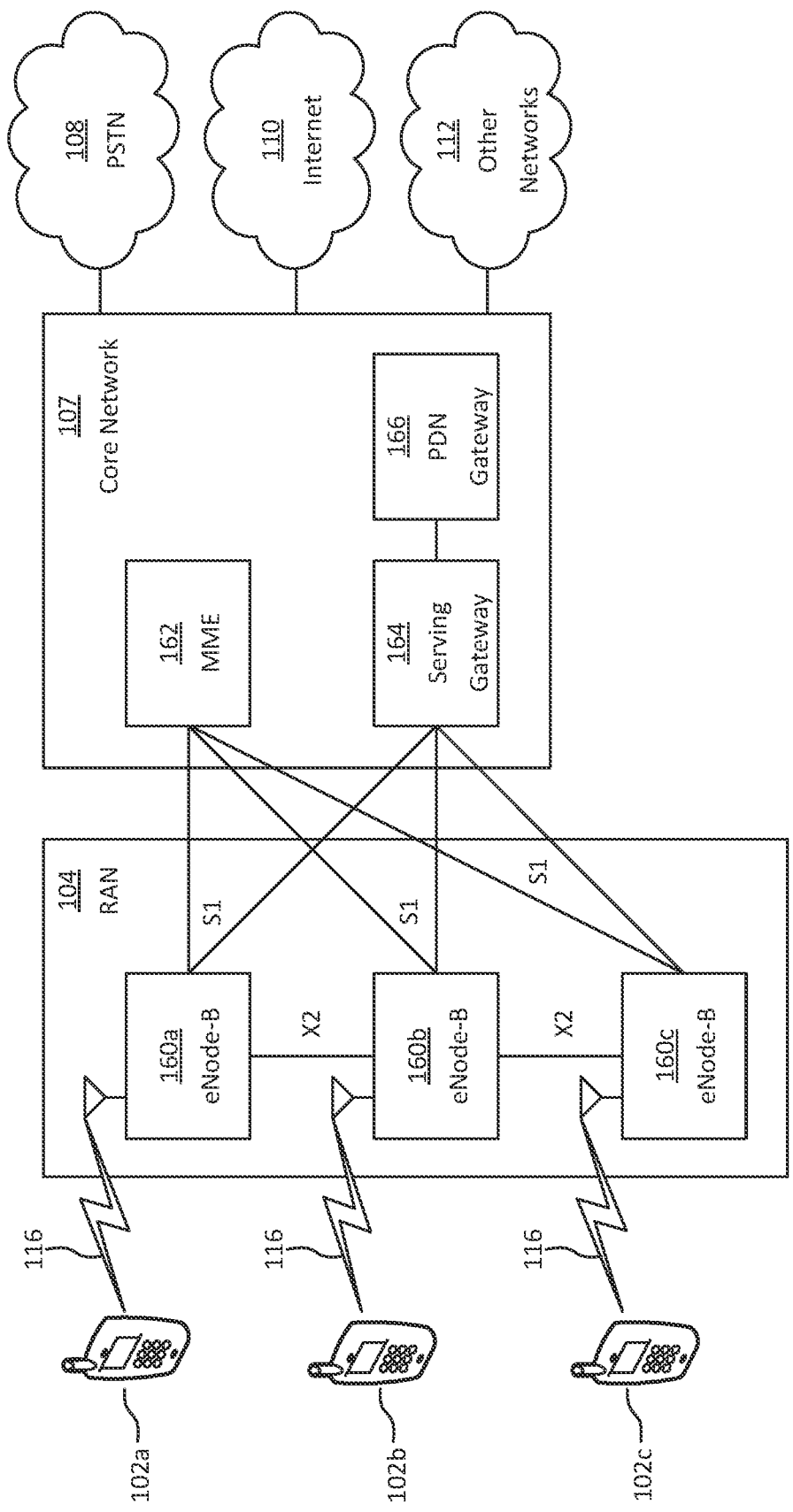

FIG. 9C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 9C, the eNode-Bs 160a, 160b, and 160c may communicate with one another over an X2 interface.

The core network 107 shown in FIG. 9C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 9D:
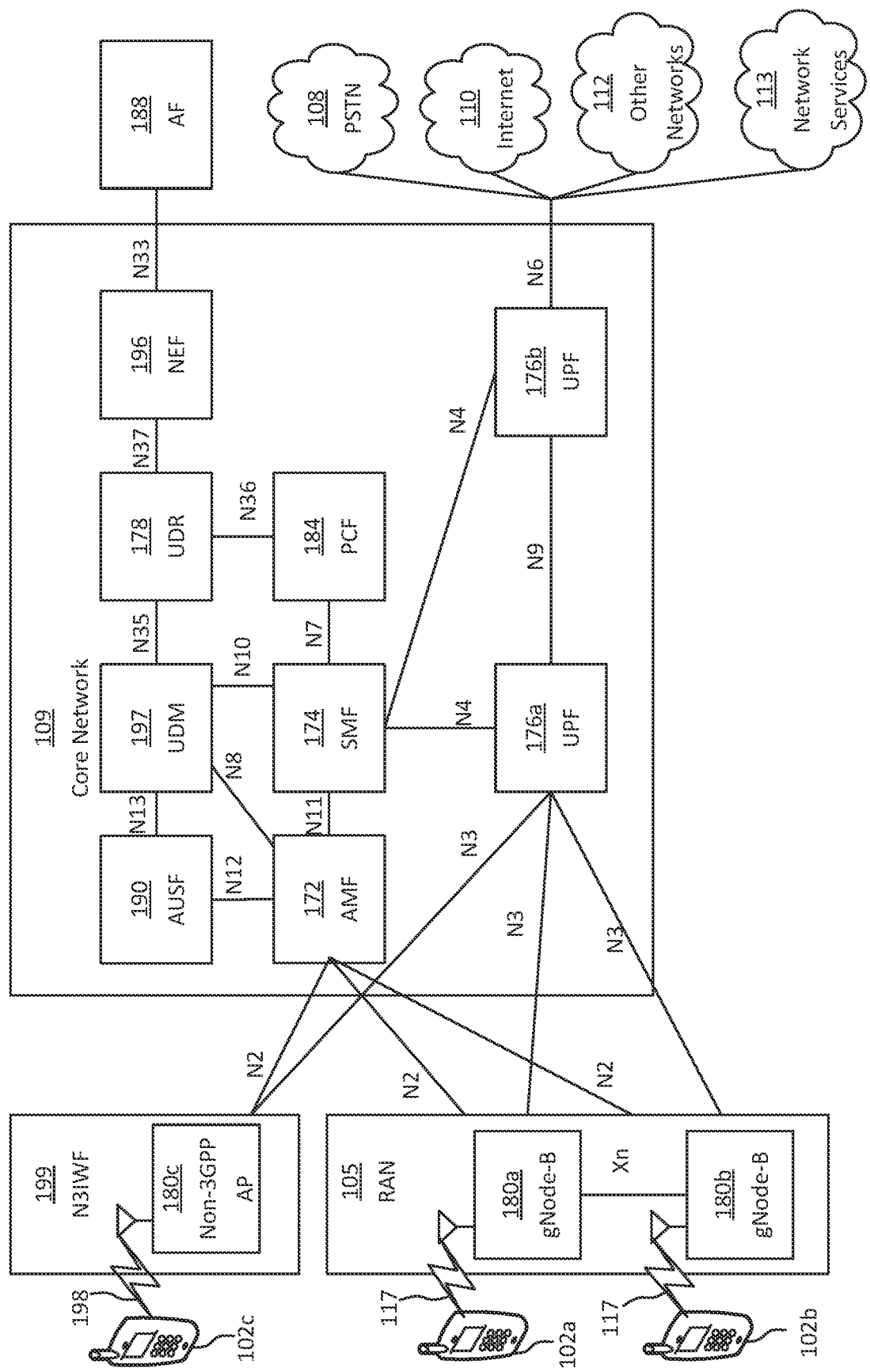

FIG. 9D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 9D, the gNode-Bs 180a and 180b may communicate with one another over an Xn interface, for example.

The core network 109 shown in FIG. 9D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 9G.

In the example of FIG. 9D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 9D shows that network functions directly connect to one another, however, it should be appreciated that they may communicate via routing agents such as a diameter routing agent or message buses.

In the example of FIG. 9D, connectivity between network functions is achieved via a set of interfaces, or reference points. It will be appreciated that network functions may be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 9D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 9D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that may be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g., in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 9D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIGS. 9A, 9C, 9D, and 9E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 9A, 9B, 9C, 9D, and 9E are provided by way of example only, and it is understood that the subject matter disclosed and claimed herein may be embodied or implemented in any similar communication system, whether presently defined or defined in the future.

Figure 9E:
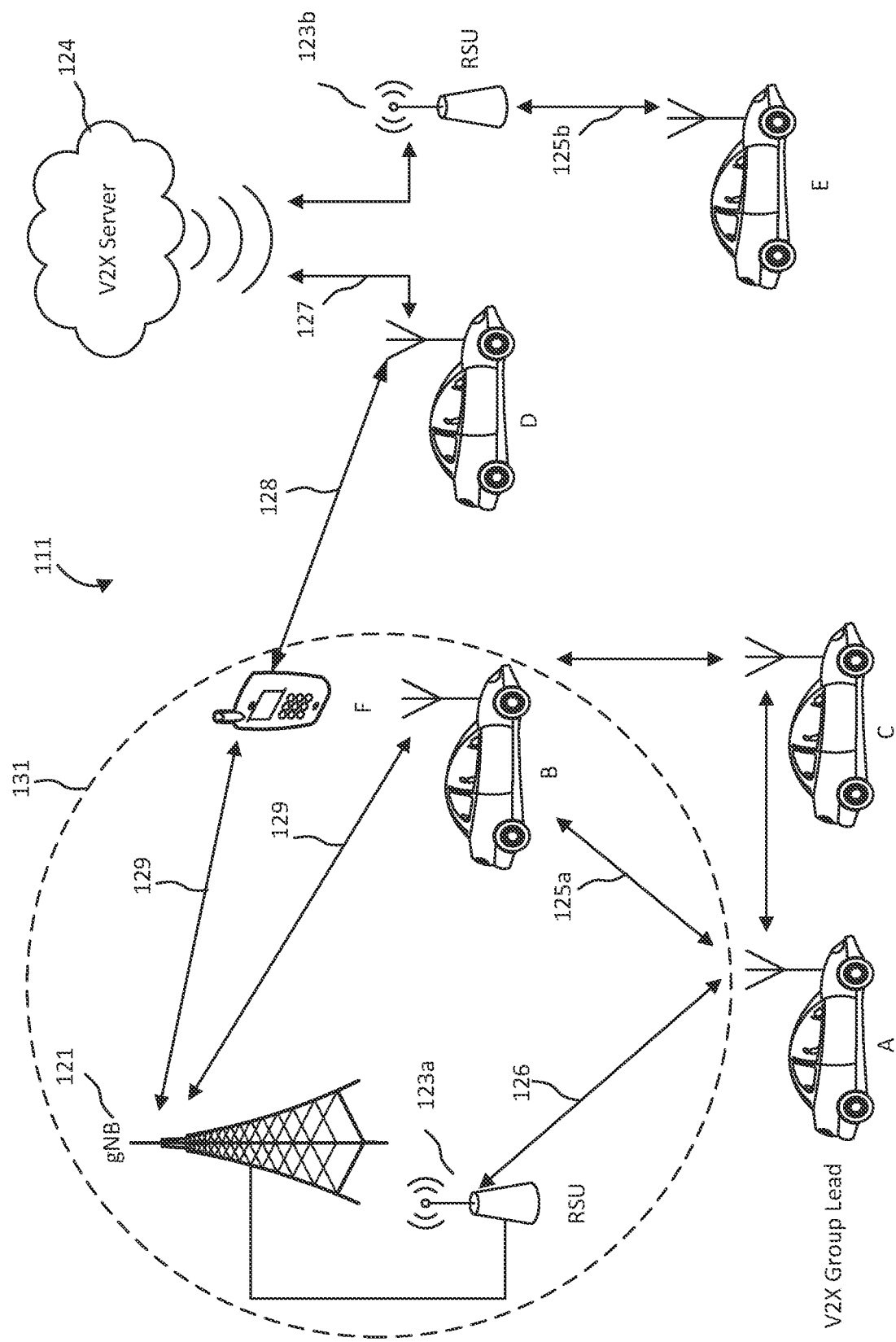
FIG. 9E illustrates another example communications system.

FIG. 9E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 9E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 9E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 9F:
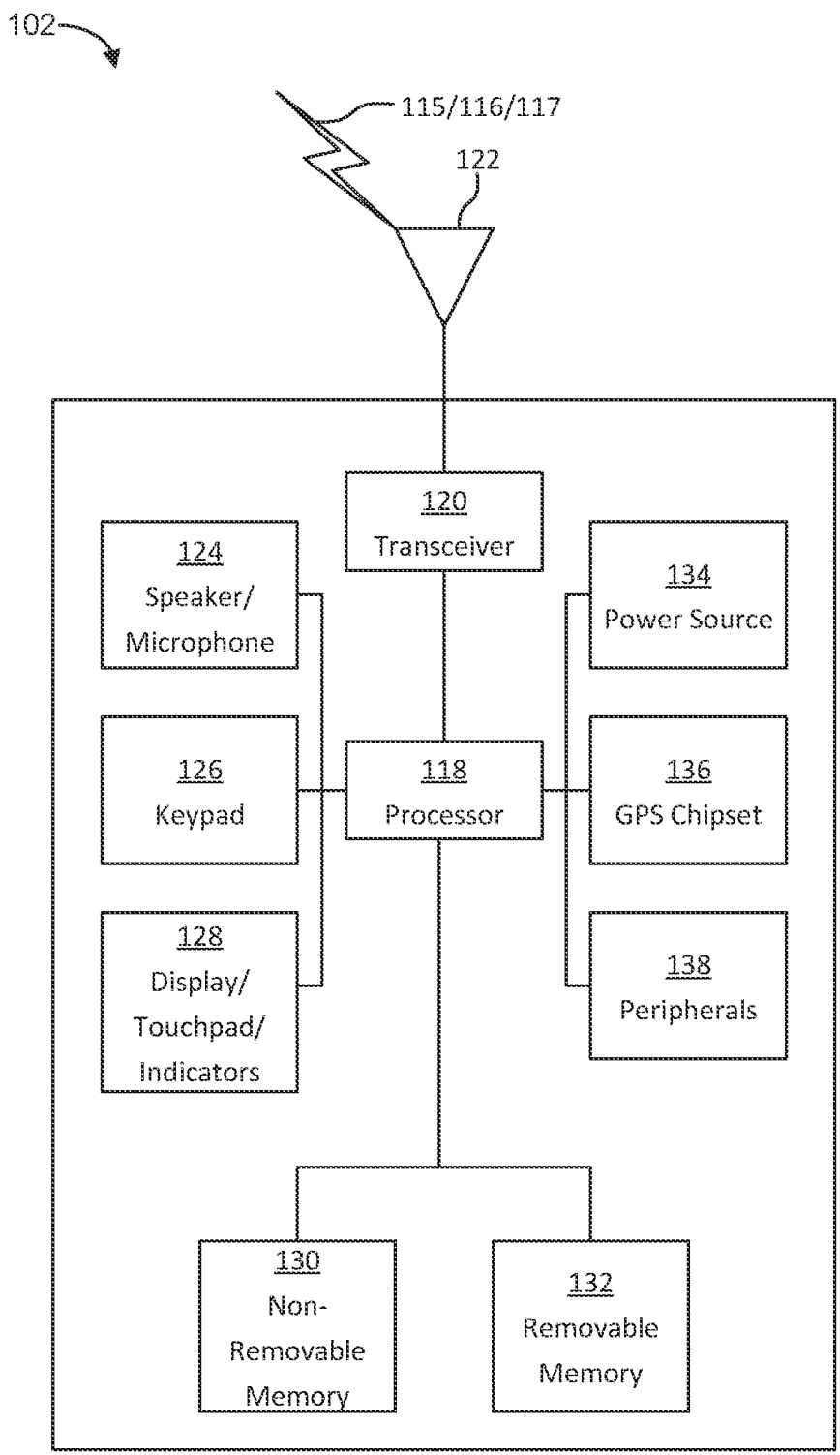
FIG. 9F is a block diagram of an example apparatus or device, such as a WTRU.

FIG. 9F is a block diagram of an example apparatus or device WTRU 102 that may be configured for wireless communications and operations in accordance with the systems, methods, and apparatuses described herein, such as a WTRU 102 of FIG. 9A, 9B, 9C, 9D, or 9E. As shown in FIG. 9F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 9F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 9F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 9A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 9F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 9G:
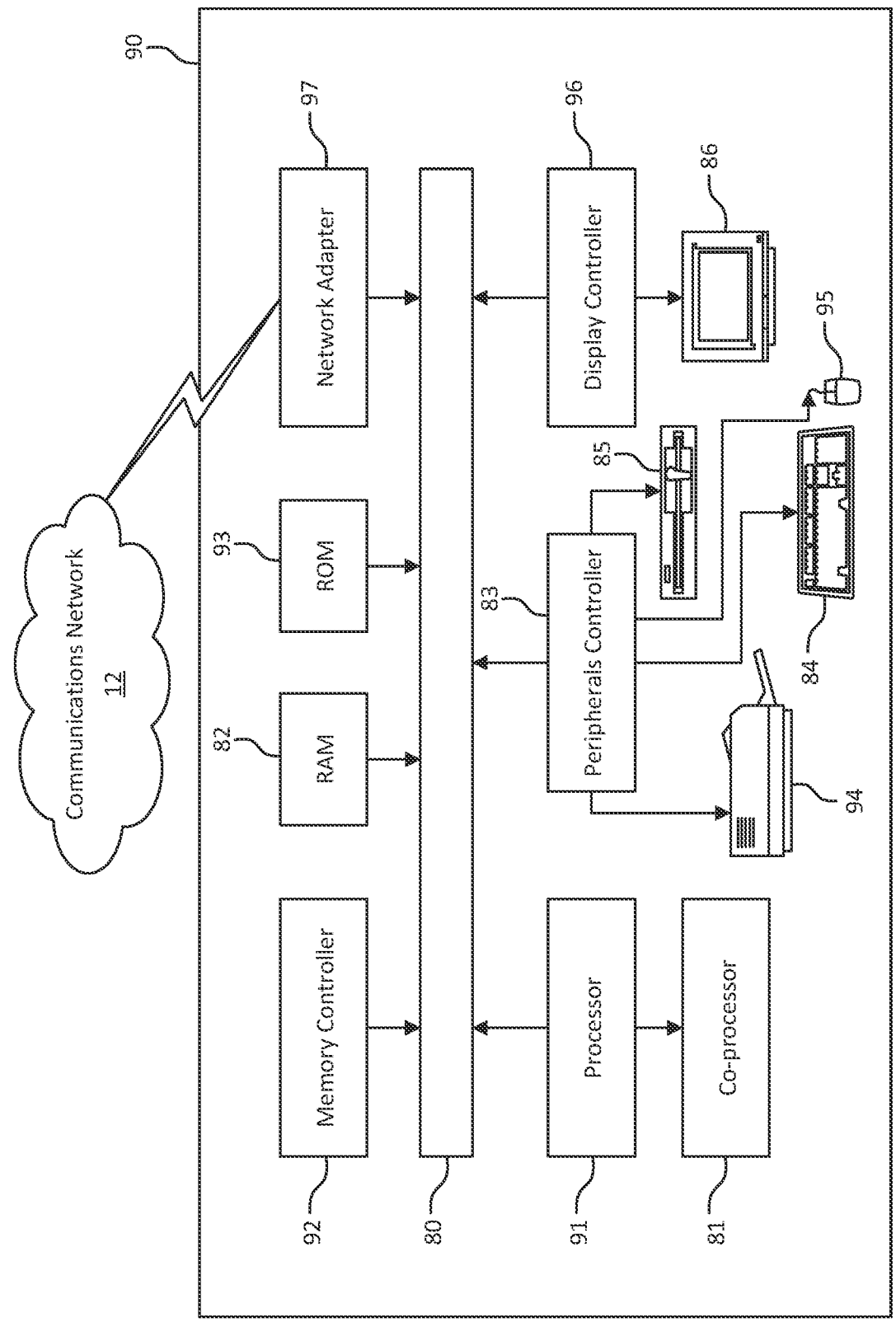
FIG. 9G is a block diagram of an exemplary computing system.

FIG. 9G is a block diagram of an exemplary computing system 90 in which one or more apparatuses of the communications networks illustrated in FIGS. 9A, 9C, 9D and 9E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 9A, 9B, 9C, 9D, and 9E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

What is claimed is:

1. A wireless transmit/receive unit (WTRU), comprising a transceiver and one or more processors, configured to:
   receive a traffic descriptor and a route selection descriptor (RSD), wherein the traffic descriptor includes a first data network name (DNN) and the RSD includes a second DNN;
   determine a third DNN provided by an application;
   determine that the third DNN matches the first DNN;
   determine, based on the RSD, a protocol data unit (PDU) session associated with the second DNN; and
   route, using the PDU session, traffic provided by the application.

2. The WTRU of claim 1, wherein the WTRU being configured to determine the PDU session comprises the WTRU being configured to send a PDU establishment request comprising the second DNN.

3. The WTRU of claim 2, wherein the PDU Session Establishment request includes an indication that the second DNN is a replacement DNN.

4. The WTRU of claim 1, wherein the PDU session is an existing PDU session.

5. The WTRU of claim 1, wherein the WTRU is configured to receive a user equipment route selection policy (URSP) rule comprising the traffic descriptor and the RSD.

6. The WTRU of claim 5, wherein the URSP rule is received in a Non-Access Stratum (NAS) message.

7. The WTRU of claim 5, wherein the WTRU is configured to send an indication that the WTRU is configured to receive the USRP rule.

8. The WTRU of claim 7, wherein the indication is sent in a Registration Request.

9. The WTRU of claim 5, wherein the USRP rule is received in a UE Configuration Update message.

10. The WTRU of claim 1, wherein the WTRU being configured to determine the third DNN matches the first DNN comprises the WTRU being configured to determine the third DNN is equal to the first DNN.

11. A method performed by a wireless transmit/receive unit (WTRU), the method comprising:
   receiving a traffic descriptor and a route selection descriptor (RSD), wherein the traffic descriptor includes a first data network name (DNN) and the RSD includes a second DNN;
   determining a third DNN provided by an application;
   determining that the third DNN matches the first DNN;
   determining, based on the RSD, a protocol data unit (PDU) session associated with the second DNN; and
   routing, using the PDU session, traffic provided by the application.

12. The method of claim 11, wherein determining the PDU session comprises sending a PDU establishment request comprising the second DNN.

13. The method of claim 12, wherein the PDU Session Establishment request includes an indication that the second DNN is a replacement DNN.

14. The method of claim 11, wherein the PDU session is an existing PDU session.

15. The method of claim 11, wherein the WTRU is configured to receive a user equipment route selection policy (URSP) rule comprising the traffic descriptor and the RSD.

16. The method of claim 15, wherein the URSP rule is received in a Non-Access Stratum (NAS) message.

17. The method of claim 15, wherein the WTRU is configured to send an indication that the WTRU is configured to receive the USRP rule.

18. The method of claim 17, wherein the indication is sent in a Registration Request.

19. The method of claim 15, wherein the USRP rule is received in a UE Configuration Update message.

20. The method of claim 11, wherein determining the third DNN matches the first DNN comprises determining the third DNN is equal to the first DNN.

* * * * *